US012809083B2

(12) United States Patent
Sezer et al.

(10) Patent No.: US 12,809,083 B2

(45) Date of Patent: Nov. 24, 2026

(54) PHOTONIC INTEGRATED CIRCUIT

(71) Applicant: Österreichische Akademie der Wissenschaften, Vienna (AT)

(72) Inventors: Ugur Sezer, Gablitz (AT); Fabian Laudenbach, Vienna (AT)

(73) Assignee: Österreichische Akademie der Wissenschaften, Vienna (AT)

( * ) Notice: Subject to any disclaimer, the term of this patent is extended or adjusted under 35 U.S.C. 154(b) by 556 days.

(21) Appl. No.: 18/020,489

(22) PCT Filed: Aug. 9, 2021

(86) PCT No.: PCT/EP2021/072193

§ 371 (c)(1),
(2) Date: Feb. 9, 2023

(87) PCT Pub. No.: WO2022/034038

PCT Pub. Date: Feb. 17, 2022

(65) Prior Publication Data

US 2023/0305225 A1 Sep. 28, 2023

(30) Foreign Application Priority Data

Aug. 10, 2020 (EP) .................................... 20190320

(51) Int. Cl.
*G02B 6/12* (2006.01)
*G02B 6/30* (2006.01)

(52) U.S. Cl.
CPC ..... *G02B 6/12004* (2013.01); *G02B 6/12002* (2013.01); *G02B 6/305* (2013.01); *G02B 2006/12061* (2013.01)

(58) Field of Classification Search
CPC .. G02B 6/12004; G02B 6/4214; G02B 6/125; G02B 6/2817
See application file for complete search history.

(56) References Cited

U.S. PATENT DOCUMENTS 4,984,298 A * 1/1991 Slusher ................ G01C 19/721
356/450
2006/0034569 A1 2/2006 Shih
(Continued)

FOREIGN PATENT DOCUMENTS

EP 2711772 A1 * 3/2014 .............. G02F 3/00
JP H0566439 A 3/1993
JP 2002048932 A 2/2002

OTHER PUBLICATIONS

PCT/EP2021/072193, International Search Report and Written Opinion, Oct. 26, 2021, 18 pages.

*Primary Examiner* — Eric Wong
(74) *Attorney, Agent, or Firm* — Whitaker Chalk Swindle & Schwartz PLLC; Bradley J. Birchfield; Enrique Sanchez, Jr.

(57) ABSTRACT

A photonic integrated circuit, comprising a first waveguide on a first waveguide substrate, and a second waveguide on a second waveguide substrate is presented. The photonic integrated circuit further comprises a resonator device with a first mirror, comprising a first layered structure on a first mirror substrate, wherein the first mirror substrate is provided by or fixed to the first waveguide substrate or the second waveguide substrate. The resonator device further comprises a second mirror that comprises a second layered structure on a second mirror substrate. The second mirror substrate is provided by or fixed to the first waveguide substrate or the second waveguide substrate. The first mirror and the second mirror form end mirrors of an optical resonator. At least a portion of the first waveguide is within the optical resonator. The first waveguide substrate is continuous with the second waveguide substrate.

20 Claims, 13 Drawing Sheets

(56) References Cited

U.S. PATENT DOCUMENTS

| | | | | |
|---|---|---|---|---|
| 2006/0238866 | A1* | 10/2006 | Von Lerber | H04B 10/299<br>359/485.05 |
| 2015/0063398 | A1* | 3/2015 | Okamoto | H01S 5/0078<br>372/92 |
| 2019/0391329 | A1* | 12/2019 | Martin | G02B 6/125 |
| 2022/0131342 | A1* | 4/2022 | Van Rees | H01S 3/106 |

* cited by examiner

PHOTONIC INTEGRATED CIRCUIT

TECHNICAL FIELD

The disclosure relates to the technical field of photonic integrated circuits, in particular to an alignment of optical components in integrated photonic circuits, and in particular to the alignment of an optical resonator with respect to a waveguide in an integrated photonic circuit.

BACKGROUND

Quantum computing is currently being developed with the prospective to accelerate the development of molecules for pharmaceutical applications or organic solar cells, to optimize logistics and financial markets investment, and to allow for secure cloud computing. To date, quantum computer processors with a handful of qubits to almost hundred qubits have been demonstrated. However, thousands of qubits are expected to be required for a fault-tolerant quantum correction for practical applications. It was shown theoretically that quantum computing with squeezed states of light has the potential to provide the scalability to implement thousands of qubits. The realization of this approach benefits from the physical implementation of a system which can integrate numerous sources of squeezed light. With the bulk optics commonly used as sources of squeezed lights this is a challenge. Photonic integrated circuits may solve the problem of integrating numerous optical components, in particular optical resonators, in a single device by forming the components on a continuous substrate. The continuous substrate may be an integral piece in a monolithic approach. The continuous substrate may also be constructed combining two or more substrates. The two or more substrates can comprise different materials in a hybrid approach.

In particular, the coupling of the optical resonator to a waveguide may be essential, as the waveguide mediates the coupling to other components. The optical resonator can give rise to a multipass geometry or a larger field strength of an electromagnetic wave inside the optical resonator than outside of it. The multipass geometry or the larger field strength improves the efficiency of a device comprising the optical resonator, in particular of a device adapted for a nonlinear process to take place in the optical resonator. In this context, the efficiency of the device may be characterized by a conversion rate of photons in the incoming electromagnetic wave to photons in the generated electromagnetic wave. The efficiency of the device may be characterized by an enhancement factor of the cavity. The efficiency of the device may also be a number of photons in the generated electromagnetic wave per photon in the incoming electromagnetic wave entering the resonator. Alternatively, the efficiency of the device may be characterized as the power of a generated electromagnetic wave per power of the incoming electromagnetic wave. In particular, the multipass geometry or the larger field strength can improve the efficiency of a device which comprises the optical resonator and is configured to generate squeezed light, and it can improve the squeezing factor of the squeezed light. The improved efficiency of the device and the improved squeezing factor may improve the performance of the device in applications, in particular in applications in quantum optics, for example in quantum computing.

Stefszky et al., Physical Review Applied 7, 044026 (2017) and Stefszky et al., Journal of Optics 20(6), 065501 (2018) demonstrate the use of a lithium-niobate waveguide, i.e. of a nonlinear medium with a non-vanishing Chi2 nonlinearity, in an optical resonator for squeezed-light generation and for second-harmonic generation.

Optical resonators have been integrated into photonic integrated circuits as ring resonators, described, for example, in EP3444657A1, or with gratings forming grating reflectors as end elements of a optical resonator, described, for example, in Smit et al., Semiconductor Science and Technology 29, 083001 (41 pages) (2014). Widely applied ring resonators are composed of nonlinear media with a vanishing Chi2 nonlinearity, for example silicon, which limits the efficiency of nonlinear processes in the ring resonator. Ring resonators with a vanishing Chi2 nonlinearity apply four-wave mixing, a Chi3 nonlinear process, which typically generates photon pairs with unequal energies of the photons (non-degenerate pair), whereas photon pairs with equal energies of the photons (degenerate pair) are desirable for many applications. Moreover, the efficiency of a device using a Chi2 nonlinear process may exceed the efficiency of a device using a Chi3 nonlinear process. The implementation of a Chi2 nonlinear process in a ring resonator is challenging. Moreover, ring resonators suffer disadvantageous bending losses, which increase with a decreasing radius of the ring resonator. Therefore, a ring resonator cannot easily have both a short optical resonator length and a high finesse. An optical resonator with a short length and a high finesse is desirable in many applications, for example for generating single frequency modes of ultra-narrow bandwidth or for wavelength-division multiplexing.

JP Ho 66439 A discloses an optical wavelength conversion device with an optical waveguide type optical wavelength conversion element and with laser diodes.

An optical resonator has been integrated into a polymer-based photonic-integrated circuit using the hybrid approach, see Happach et al., Optics Express 25, pages 27665-27670 (2017). The integrated optical resonator is a bulk etalon. Polymer-based photonic integrated circuits may suffer from a low thermal conduction and from high optical losses, for example due to an absorption in the polymer. The optical loss can limit a finesse of the optical resonator and reduce the efficiency of a device comprising the optical resonator. The generation of heat may be especially critical in polymer-based photonic-integrated circuits because of the low thermal conduction and a limited thermal stability.

Optical resonators have also been integrated into photonic integrated circuits using coupling elements, as described for example in Dietrich et al., Nature Photonics 12, pages 241-247 (2018). The device described by Dietrich et al. uses coupling elements to compensate a misalignment between the optical resonator and a neighboring waveguide. The coupling elements may cause an optical loss. The optical loss can limit a finesse of the optical resonator, reduce the efficiency of an optical device comprising the optical resonator, limit a squeezing of squeezed light produced in the optical resonator, and/or may generate heat that needs to be transported away to maintain a stability of the device.

Overview

In view of the technical problems described above, there is a need for an improved optical resonator that can easily be co-integrated with other optical components on a common substrate and that can be manufactured efficiently and in large numbers.

This objective is achieved with a photonic integrated circuit according to independent claim 1. Independent claim 12 provides a method for producing a photonic integrated circuit. The dependent claims relate to preferred embodiments.

In a first aspect, the disclosure relates to a photonic integrated circuit, comprising a first waveguide on a first waveguide substrate, a second waveguide on a second waveguide substrate, a resonator device, comprising a first mirror, comprising a first layered structure on a first mirror substrate, wherein the first mirror substrate is provided by or fixed to the first waveguide substrate or the second waveguide substrate, a second mirror, comprising a second layered structure on a second mirror substrate, wherein the second mirror substrate is provided by or fixed to the first waveguide substrate or the second waveguide substrate; wherein the first mirror and the second mirror form end mirrors of an optical resonator, and wherein at least a portion of the first waveguide is within the optical resonator; characterized in that the first waveguide substrate is continuous with the second waveguide substrate, and in that the first waveguide at a first end of the first waveguide is aligned with the second waveguide at a second end of the second waveguide.

The portion of the first waveguide within the optical resonator can advantageously be used to route a beam and/or to control a beam quality and/or to control a profile of an optical beam inside the optical resonator, in particular of a laser beam inside the optical resonator. In particular, using established techniques, the portion of the first waveguide within the optical resonator may be designed to support a specified width, diameter, divergence, transverse mode, or mode spacing of the optical beam. For example, the portion of the first waveguide within the optical resonator may be designed to route a beam and/or to control a beam quality and/or to control a profile of an optical beam inside the portion of the first waveguide within the optical resonator. The portion of the first waveguide within the optical resonator may also be designed to route a beam and/or to control a beam quality and/or to control a profile of an optical beam inside a free space or a gas volume in the optical resonator.

As the first waveguide at the first end of the first waveguide is aligned with the second waveguide at the second end of the second waveguide, the resonator and the second waveguide are aligned with respect to one another in a static and stable way. The static and stable alignment can improve the performance of a device that comprises the photonic integrated circuit. Moreover, the static and stable alignment results in a compact device geometry, which may be beneficial for a cost of production of the device and for the co-integration of other optical, electro-optical, and/or heat-conducting components. The static and stable alignment can render additional adjustment unnecessary.

The alignment of the first waveguide at the first end of the first waveguide with the second waveguide at the second end of the second waveguide can relax or eliminate the need for a coupling element which compensates an angular misalignment between the optical resonator and the second waveguide. This may be an advantage over existing integrated optical resonators as described, for example, in Smit et al. and Dietrich et al., which may require a coupling element for compensating an angular misalignment, and possibly also for controlling a divergence of a light beam. The coupling element for compensating the angular misalignment may cause optical losses due to absorption and scattering in the coupling element and at interfaces to the coupling element. Avoiding the coupling element for compensating an angular misalignment can avoid the optical losses and improve the efficiency of a device comprising the photonic integrated circuit. Avoiding the coupling element for compensating an angular misalignment can also increase a finesse of the optical resonator, which can result in a higher electric field strength inside the optical resonator and a sharper resonance profile of the optical resonator. Avoiding the coupling element for compensating an angular misalignment can also reduce the complexity of producing the photonic integrated circuit, because the production involves producing and positioning fewer components, improving the reliability and reducing the cost of production. Avoiding the coupling element for compensating an angular misalignment can also improve the mechanical integrity and rigidity of the photonic integrated circuit, as fewer components can move with respect to each other, for example in the presence of an unintended movement such as a mechanical vibration. Moreover, the photonic integrated circuit according to Claim 1 advantageously allows for easy integration of a coupling element for controlling the divergence of the light beam, for example if one of the end mirrors of the optical resonator is a curved mirror.

The optical resonator can flexibly be adjusted to and optimized for specific applications by designing reflectivities and transmittances of the end mirrors. In particular, the optical resonator can act as a cavity. The advantage of flexibility is a result of the comprised first layered structure and second layered structure. The first layered structure and the second layered structure may, for example, be designed for a high reflectivity of at least one mirror of the first mirror and the second mirror. For a high finesse of the optical resonator, both the first layered structure and the second layered structure may be designed for a high reflectivity. For example, the first layered structure and the second layered structure may be designed for a high reflectivity for a first electromagnetic wave with a first frequency, and a high transmittance for a second electromagnetic wave with a second frequency. Furthermore, additional optical components may be fabricated using similar techniques or a same coating device as for the end mirrors, for example additional bending mirrors co-integrated with the photonic integrated circuit, either as part of the optical resonator or separate from the optical resonator.

In one embodiment, the first waveguide or the second waveguide comprises lithium niobate, lithium tantalate, beta barium borate, lithium triborate, potassium titanyl phosphate, silicon, silicon oxide, aluminum arsenide, gallium arsenide, aluminum gallium arsenide, or silicon nitride.

In an embodiment, the first waveguide or the second waveguide comprises titanium-indiffused lithium niobate or magnesium-indiffused lithium niobate or silicon-indiffused silicon oxide.

The first waveguide substrate and the first waveguide may form an integral piece. Here, an integral piece may refer to a piece which does not have a noticeable internal interface that would separate the piece into two pieces.

The second waveguide substrate and the second waveguide may form an integral piece.

In one embodiment, the first waveguide substrate and the second waveguide substrate form an integral piece. In the context of the present disclosure, this is referred to as a monolithic approach. The monolithic approach may be used to optimize the mechanical rigidity of the photonic integrated circuit and its resilience to unintended movements such as vibrations. In the monolithic approach, the first waveguide substrate and the second waveguide substrate may be processed together using the same processing techniques. This facilitates a fabrication of the photonic integrated circuit and reduces its cost. The monolithic approach may also be used to ensure the alignment of the first waveguide at the first end of the first waveguide and the second waveguide at the second end of the second waveguide. For example, the first waveguide and the second waveguide can initially be produced as a single, continuous waveguide and can later be separated by a recess.

In another embodiment, the first waveguide substrate is mostly composed of a first material, which is different from a second material, which the second waveguide substrate is mostly composed of. In the context of the present disclosure, this is referred to as a hybrid approach. The first material may be selected or optimized for a first specific functionality. The second material may be selected or optimized independently from the first material for a second specific functionality. The hybrid approach hence allows for combining the most suitable materials for specific functionalities. More than two materials optimized for more than two functionalities may be combined in one photonic integrated circuit.

Here and in the following, a component may be understood to be mostly composed of a specified material, if a weight of the specified material comprised in the component is at least half of a weight of the component, or in particular at least two thirds of a weight of the component.

The first mirror substrate may be different from the first waveguide substrate.

A first material, that the first mirror substrate is mostly composed of, may be different from a second material, which the first waveguide substrate is mostly composed of.

In one embodiment, a length of the optical resonator is at least 1 μm, in particular 100 μm, or 1 mm, or 5 mm. In one embodiment, the length of the optical resonator does not exceed 1 m, in particular 100 mm, or 50 mm, or 20 mm.

In one embodiment, a length of the portion of the first waveguide inside the optical resonator is at least 1 μm, in particular 100 μm, or 1 mm, or 5 mm. In one embodiment, the length of the portion of the first waveguide inside the optical resonator does not exceed 1 m, in particular 100 mm, or 50 mm, or 20 mm.

In one embodiment, the length of the optical resonator does not exceed the length of the portion of the first waveguide inside the optical resonator by a factor of 10, in particular a factor of 3, or 1.5.

The photonic integrated circuit advantageously allows for a compact design of the optical resonator. A short length of the optical resonator not exceeding the length of the portion of the first waveguide inside the optical resonator by a factor of 10, in particular a factor of 3, or 1.5, can minimize an optical loss caused by scattering and absorption in the optical resonator. The minimized optical loss can improve the efficiency of an optical device comprising the photonic integrated circuit. Reduced optical losses can also improve the finesse of the optical resonator. The improved finesse can, for instance, be used to increase an electric field strength inside the first waveguide. The short optical resonator length may also be used to generate a large spectral spacing of a frequency comb of electromagnetic frequencies supported by the optical resonator. The large spectral spacing may allow for selecting a single frequency from the frequency comb, for example using bandpass filtering or frequency-selective homodyne detection. For example, an ultra-narrow bandwidth may be achieved this way. As another example, the large spectral spacing may allow for wavelength-division multiplexing of the frequency modes into individual spatial modes for separate processing.

The first mirror substrate may be different from the second waveguide substrate.

A first material, of which the first mirror substrate is mostly composed, may be different from a second material, of which the second waveguide substrate is mostly composed.

The first mirror substrate and the second mirror substrate may be different from the first waveguide substrate or the second waveguide substrate.

A first material, of which the first mirror substrate is mostly composed, may be different from a second material, of which the first waveguide substrate or the second waveguide substrate is mostly composed; and/or a third material, of which the second mirror substrate is mostly composed, may be different from the second material.

In one embodiment, a portion of the first layered structure or the second layered structure is embedded within a continuous body formed by the first waveguide substrate and the second waveguide substrate. For example, this embodiment may be applied to maximize a thermal conduction between the first layered structure and the first waveguide substrate or the second waveguide substrate.

In an embodiment, a portion of the first layered structure or the second layered structure is below a top surface of the first waveguide substrate or the second waveguide substrate. For example, this embodiment may be used to maximize a thermal conduction between the first layered structure or the second layered structure and the first waveguide substrate or the second waveguide substrate.

In an embodiment, the first layered structure or the second layered structure has an orientation perpendicular to a top surface of a continuous body formed by the first waveguide substrate and the second waveguide substrate.

For instance, a width of the first waveguide and/or the second waveguide may be no smaller than 2.5 μm, in particular no smaller than 4 μm.

For instance, a width of the first waveguide and/or the second waveguide may be no larger than 10 μm, in particular no larger than 8 μm.

According to an embodiment, a thickness of the first waveguide substrate is at least 50 μm, in particular 300 μm, or 500 μm, or 2 mm.

According to an embodiment, a thickness of the first waveguide substrate does not exceed 20 mm, in particular 5 mm, or 3 mm, or 2 mm.

A large thickness of the first waveguide substrate of at least 50 μm, in particular 300 μm, or 500 μm, or 2 mm, can make the production of the photonic integrated circuit more reliable, as it reduces the risk of unintended breaking. The large thickness may also improve the rigidity and ruggedness of the photonic integrated circuit in the presence of unintended movements and in particular mechanical vibrations. Large thickness substrates typically also show less bowing and warping, i.e. are flatter, which may be favorable with respect to the performance of the device. This can enhance the lifetime of the photonic integrated circuit. The large thickness may also improve a thermal transport within the photonic integrated circuit, improving the thermal stability and/or homogeneity of the photonic integrated circuit.

A width of a continuous piece formed by the first waveguide substrate and the second waveguide substrate may be at least 1 μm, 1 mm, 10 mm, 30 mm, or 50 mm.

A width of a continuous piece formed by the first waveguide substrate and the second waveguide substrate may not exceed 100 m, 10 m, 1 m, 300 mm, or 200 mm.

A length of a continuous piece formed by the first waveguide substrate and the second waveguide substrate may be at least 1 μm, 1 mm, 10 mm, 30 mm, or 50 mm.

A length of a continuous piece formed by the first waveguide substrate and the second waveguide substrate may not exceed 100 m, 10 m, 1 m, 300 mm, or 200 mm.

A large width of a continuous piece formed by the first waveguide substrate and the second waveguide substrate or a large length of a continuous piece formed by the first waveguide substrate and the second waveguide substrate of at least 1 μm, 1 mm, 10 mm, 30 mm, or 50 mm, can support the co-integration of additional optical resonators or additional components on the photonic integrated circuit.

Both, a width and a length of the first waveguide substrate, may be at least 1 mm, and in particular 10 mm.

According to one embodiment, the photonic integrated circuit further comprises an optical bandpass filter between the first waveguide and the second waveguide.

The optical bandpass filter may be used for selecting a single frequency from a frequency comb supported by the photonic integrated circuit.

The first waveguide substrate and the second waveguide substrate may be in direct physical contact. The first waveguide substrate and the second waveguide substrate may be separated by no more than one optical component, which may in particular be the first mirror or the second mirror. The first waveguide substrate and a closest point of the second waveguide substrate may be separate by no more than 100 μm.

In an embodiment, the first waveguide and/or the first waveguide substrate comprises a nonlinear optical medium.

For example, the nonlinear medium may be adapted to support parametric down conversion, second harmonic generation, sum-frequency generation, difference-frequency generation, four-wave mixing, optical parametric amplification, optical parametric oscillation, white-light generation, Kerr lensing, two-photon absorption, or multi-photon absorption.

In an embodiment, the nonlinear medium has a non-vanishing Chi2 nonlinearity. The non-vanishing Chi2 nonlinearity can promote a high efficiency of a nonlinear process in the nonlinear optical medium, in particular compared to a reference efficiency of a reference nonlinear process in a reference nonlinear optical medium with a vanishing Chi2 nonlinearity.

The nonlinear medium with the non-vanishing Chi2 nonlinearity may comprise lithium niobate. The lithium niobate may comprise periodically poled lithium niobate. The lithium niobate may comprise titanium-indiffused lithium niobate or magnesium-indiffused lithium niobate.

Using the periodic poling, for example of periodically poled lithium niobate, a phase-matching condition of the nonlinear optical medium may be tuned. The tuning may give a maximum of flexibility of the photonic integrated circuit in terms of applications. For example, the phase-matching condition and hence the nonlinear optical medium may be tuned to support a specific nonlinear optical process. For example, the phase-matching condition and hence the nonlinear optical medium may be tuned to support a nonlinear optical process for at least one specific frequency of at least one electromagnetic wave. For example, the phase-matching condition and hence the nonlinear optical medium may be tuned to support a nonlinear optical process for a specific temperature of the nonlinear optical medium.

According to an embodiment, the nonlinear optical medium is adapted to convert an incoming electromagnetic wave with at least one incoming frequency to at least one generated electromagnetic wave with at least one generated frequency, wherein at least one generated frequency is different from at least one incoming frequency.

For example, at least one generated frequency may be smaller than at least one incoming frequency. For example, at least one generated frequency may be the double of at least one incoming frequency.

In particular, if the nonlinear medium has a non-vanishing Chi2 nonlinearity, the frequency conversion may comprise a parametric down conversion, in particular a parametric down conversion that produces degenerate photon pairs. The parametric down conversion can generate an electromagnetic wave with a generated frequency smaller than the incoming frequency of the incoming electromagnetic wave at high efficiency, in particular compared to a reference efficiency of a four-wave mixing process, which may be used in a reference nonlinear optical medium with a vanishing Chi2 linearity.

A transverse confinement of the incoming electromagnetic wave due to the waveguide structure of the first waveguide, and a confinement of the incoming electromagnetic wave along an optical axis due to the optical resonator formed by the first mirror and the second mirror may result in an enhancement of a field strength of the incoming electromagnetic wave in the first waveguide. The enhancement can improve the efficiency of a device comprising the optical resonator, in particular of a device adapted to support a nonlinear process in the nonlinear optical medium comprised in the first waveguide, for example, a frequency conversion in the nonlinear optical medium. For example, the improved efficiency of the device can relax requirements with respect to a source of optical or electric pump power, thereby reducing the technical requirements towards the device and its cost. For example, the improved efficiency can improve an output power of the generated electromagnetic wave. For example, the improved efficiency can improve a squeezing of a squeezed light, which may be generated in the nonlinear optical medium.

According to an embodiment, a field strength of the incoming electromagnetic wave inside the optical resonator is larger than a field strength of the incoming electromagnetic wave outside the optical resonator.

According to an embodiment, the generated electromagnetic wave passes through the portion of the first waveguide inside the optical resonator more than once. The generated electromagnetic wave passing through the portion of the first waveguide inside the optical resonator more than once can seed a nonlinear optical process inside the nonlinear optical medium. The seeding can improve the efficiency of a device that comprises the optical resonator and is adapted to support the nonlinear process, which can for example be a frequency conversion.

At least one incoming frequency may be in the UV or visible or IR spectral range. At least one incoming electromagnetic wave may have a wavelength of at least 200 nm, in particular of at least 400 nm. At least one incoming electromagnetic wave can have a wavelength no longer than 10 μm, in particular no longer than 1600 nm. For instance, at least one incoming electromagnetic wave can have a wavelength in a wavelength range from 840 to 860 nm, or from 1300 to 1320 nm, or from 1370 to 1390 nm, or from 1540 to 1560 nm. The incoming electromagnetic wave with a wavelength in one of these wavelength ranges may efficiently be transported in commonly used optical fibers. This may improve the integration of the photonic integrated circuit into larger optical devices. For instance, at least one incoming electromagnetic wave can have a wavelength in a wavelength range from 420 to 430 nm, or from 650 to 660 nm, or from 685 to 695 nm, or from 770 to 780 nm; and in particular to a wavelength in a range from 770 to 780 nm.

For example, applying an incoming electromagnetic wave with a wavelength in one of these wavelength ranges and using a degenerate parametric down conversion for the frequency conversion inside the nonlinear optical medium may generate a frequency that can be transmitted with low loss in commonly used optical fibers. This may improve the integration of the photonic integrated circuit into larger optical devices.

At least one generated frequency may be in the UV or the visible or the IR spectral range. At least one generated electromagnetic wave may have a wavelength of at least 200 nm, in particular of at least 400 nm. At least one generated electromagnetic wave can have a wavelength no longer than 10 μm, in particular no longer than 1600 nm. For instance, at least one generated electromagnetic wave can have a wavelength in a wavelength range from 840 to 860 nm, or from 1300 to 1320 nm, or from 1370 to 1390 nm, or from 1540 to 1560 nm; in particular from 1540 to 1560 nm. The generated electromagnetic wave with a wavelength in one of these wavelength ranges may efficiently be transported in commonly used optical fibers. This may improve the integration of the photonic integrated circuit into larger optical devices.

According to one embodiment, the generated electromagnetic wave comprises an electromagnetic wave in a squeezed state.

According to an embodiment, the first layered structure or the second layered structure comprises a layer of a material different from the first substrate and/or the second substrate. For example, the first layered structure or the second layered structure may comprise a layer composed mainly of an oxide or a halide or a chalcogenide or a III-V semiconductor. For instance, the first layered structure or the second layered structure may comprise a layer composed mainly of $TiO_2$, $SiO_2$, $MgF_2$, $Ta_2O_5$, ZnSe, $YF_3$, AlGaAs, GaAs, AlAs, AlAsSb, or GaSb. In one embodiment, the first layered structure comprises an epitaxial layer, wherein the material forming the epitaxial layer is different from the first mirror substrate. For example, the epitaxial layer may comprise semiconductor material. At least one epitaxial semiconductor layer may be comprised in a first mirror or a second mirror with a high reflectivity of at least 98%, 99.5%, 99.9% or in an ultra-performance mirror with a reflectivity of at least 99.99%.

In an embodiment, the second waveguide and/or the first waveguide substrate comprises a nonlinear optical medium.

The first mirror and/or the second mirror may have a reflectivity of at least 98%, in particular at least 99.5% or at least 99.9%.

The first mirror and/or the second mirror may have a transmittance of at least 1%, in particular at least 25% or at least 40%. The transmittance may be used to couple an electromagnetic wave out of the optical resonator or into the optical resonator.

A roughness of a portion of the first mirror substrate or of the second mirror substrate may be <5 nm, in particular <1 nm. The lower roughness<5 nm, in particular <1 nm, may be applied in a first mirror or a second mirror with a high reflectivity of at least 98%, 99.5%, 99.9% or in an ultra-performance mirror with a reflectivity of at least 99.99%.

The first layered structure or the second layered structure may comprise a layer composed mainly of a metal, in particular gold, silver, or aluminum. Composing the layer mainly of a metal can reduce the complexity of the first layered structure and the cost of producing the photonic integrated circuit.

The first layered structure and/or the second layered structure may be in physical contact with the first waveguide. The first layered structure and/or the second layered structure in contact with the first waveguide can minimize the length of the optical resonator. The minimized length of the optical resonator can minimize an optical loss caused by scattering and absorption in the optical resonator.

The photonic integrated circuit may comprise a space between the first mirror or the second mirror and the first optical waveguide or the second waveguide, and the space may be filled with vacuum or a filler material. The vacuum or the filler material may improve the coupling of an electromagnetic wave between the first waveguide and the second waveguide. The filler material may reduce the difference in the indices of refraction of the space and the first mirror or the second mirror. The filler material may reduce the difference in the indices of refraction of the space and the first optical waveguide or the second waveguide.

The first layered structure or the second layered structure may have a thickness of at least 1 μm, in particular of at least 5 μm.

The first layered structure or the second layered structure may have a thickness not exceeding 100 μm, in particular 50 μm, or 20 μm, or 10 μm. The small thickness of the layered structure not exceeding 100 μm, in particular 50 μm, or 20 μm, or 10 μm, may offer advantages over the much larger thickness of known Bragg gratings, which are applied as end mirrors in integrated optical resonators. In particular, the small thickness can reduce the scattering and absorption at the end mirror. Further, the small thickness can increase the density at which the first layered structure or the second layered structure can be integrated in a larger photonic integrated circuit, and ultimately the density at which the optical resonator can be integrated in a larger photonic integrated circuit.

The photonic integrated circuit may comprise at least one additional layered structure on the first mirror substrate or the second mirror substrate. The additional layered structure may comprise an antireflection coating, an optical bandpass filter, an optical shortpass filter, or an optical longpass filter. For example, the antireflection coating may have a reflectivity <2%, in particular <0.5%.

The photonic integrated circuit may further comprise a second optical resonator and a third mirror with a third layered structure on a third mirror substrate, wherein the third mirror substrate is provided by or fixed to the first waveguide substrate or the second waveguide substrate, and wherein the third mirror forms an end mirror of the second optical resonator, the second optical resonator being different from and/or spatially separate from the optical resonator.

The design of the photonic integrated circuit can advantageously promote the co-integration of additional optical resonators which share with the optical resonator a continuous chip formed by the first waveguide substrate and the second waveguide substrate. In particular, the co-integration of additional optical resonators on the same chip reduces the cost of production. In particular, the co-integration of additional optical resonators minimizes movement of the optical resonator and the additional optical resonators with respect to one another, for example in the presence of mechanical vibrations, thus improving the performance of a device comprising the photonic integrated circuit. More than one additional mirror may be co-integrated. More than one additional optical resonator may be co-integrated. At least one additional waveguide within an additional optical resonator of an additional optical resonator may be co-integrated. At least one second additional waveguide aligned with an additional waveguide may be integrated. The co-integration of additional optical resonators and/or waveguides can provide a scalability of the photonic integrated circuit, which is, for example, an advantage for quantum computing with continuous variables. In an advanced application, mirrors and/or resonators and/or waveguides may be co-integrated on the same chip in a large number exceeding ten or a hundred or a thousand.

The photonic integrated circuit may further comprise a fourth mirror comprising a fourth layered structure on a fourth mirror substrate, wherein the fourth mirror substrate is provided by or fixed to the first waveguide substrate or the second waveguide substrate, and wherein the fourth mirror forms an end mirror of the second optical resonator of the second optical resonator.

The photonic integrated circuit may further comprise a third waveguide, wherein at least a portion of the third waveguide is within the second optical resonator.

The photonic integrated circuit may further comprise a fourth waveguide, wherein the fourth waveguide at a fourth end of the fourth waveguide is aligned with the third waveguide at a third end of the third waveguide.

In an embodiment, the photonic integrated circuit further comprises at least one heat sink in physical contact with the first waveguide substrate or the second waveguide substrate.

A thermal conductivity of the heat sink may be at least 150 W/(m·K).

The heat sink may comprise diamond, or silicon carbide or aluminum nitride, copper, silver or gold. For instance, the heat sink may comprise diamond grown by chemical vapor deposition (CVD) or silicon carbide grown by CVD.

According to an embodiment, the photonic integrated circuit comprises at least two heat sinks on different sides of the first waveguide substrate.

The design of the photonic integrated circuit with the first waveguide substrate and the second waveguide substrate forming a continuous chip can provide an efficient heat transfer or thermal conduction within the chip and away from the chip, and a large contact area for heat sinks on the first waveguide substrate and the second waveguide substrate. The large contact area may be used for physically contacting at least one heat sink with the photonic integrated circuit resulting in an efficient heat transfer or thermal conduction between the chip and the heat sink. The heat sink can improve a thermal stability of the photonic integrated circuit. The improved thermal stability can improve the performance of a device comprising the photonic integrated circuit, in particular the performance of a photonic integrated circuit with a nonlinear optical medium, because a nonlinearity of the nonlinear optical medium can depend critically on temperature. For example, the improved thermal stability can make an output of the device more stable. For example, the improved thermal stability can allow for increasing an optical or electric pump power applied to the device. For example, increasing the optical or electric pump power can improve a squeezing of a squeezed light, which may be generated in the nonlinear optical medium. For example, the efficient thermal transport may be used to control the temperature of photonic-integrated light-detection modules (single-photon avalanche diodes, PIN diodes) and to reduce their optical background noise. Furthermore, the thermal properties of the heat sink, for example a low thermal capacity and a high heat conductance, may advantageously be used for faster modulation of temperature-controlled linear-optic elements, including phase shifters and variable beam splitters.

In an embodiment, the first waveguide substrate or the second waveguide substrate exhibits at least one of the following: an integrated gas cell, a microstructure, a waveguide, a phase shifter, a beam splitter, a delay line, an interferometer, an electrode, a photodetector, in particular a photodiode, an avalanche diode, a squeezed-light source, a sensor, a Peltier element, a heat sink.

The design of the photonic integrated circuit can advantageously promote the co-integration of additional components which share with the optical resonator a continuous chip formed by the first waveguide substrate and the second waveguide substrate. Additional components can comprise a microstructure, a waveguide, a phase shifter, a beam splitter, a delay line, an interferometer, an electrode, a photodetector, in particular a photodiode, an avalanche diode, a squeezed-light source, a sensor, a Peltier element, a heat sink. For example, the co-integration of additional components on the same chip may reduce the cost of production. The co-integration of additional optical resonators can improve the performance of a device comprising the photonic integrated circuit. For example, the co-integration may improve the performance by minimizing a movement of the optical resonator and the additional optical resonators with respect to one another, for example in the presence of mechanical vibrations. For example, the co-integration may improve the performance by providing a scalability of the photonic integrated circuit, which is, for example, an advantage for quantum computing with continuous variables. The additional components may benefit from the good thermal conductivity of a heat sink on the first waveguide substrate or the second waveguide substrate, improving the performance of the additional components.

The first waveguide substrate or the second waveguide substrate may comprise at least one of the following: silicon, silicon oxide, lithium niobate, beta barium borate, lithium triborate, potassium titanyl phosphate, silicon nitride, aluminum arsenide, gallium arsenide, aluminum gallium arsenide, indium phosphide, gallium phosphide, or silicon carbide. The first waveguide substrate or the second waveguide substrate may comprise crystalline material.

The photonic integrated circuit may further comprise a focusing or defocusing element, at least a portion of which is located between the first waveguide and the second waveguide. The focusing or defocusing element may improve the coupling of an electromagnetic wave between the first waveguide and the second waveguide. For example, an improved coupling improves the efficiency of a device comprising the photonic integrated circuit.

For instance, the focusing or defocusing element may comprise a curved mirror. The curved mirror may have a surface with a spherical or cylindrical or parabolic shape, or with a shape of a Cartesian oval. The shape of the surface of the curved mirror may be optimized to reduce spherical aberration below reference spherical aberration of a curved mirror with a spherical surface. The minimized spherical aberration may improve the coupling of an electromagnetic wave between the first waveguide and the second waveguide. For example, an improved coupling improves the efficiency of a device comprising the photonic integrated circuit.

According to one embodiment, the first mirror and/or the second mirror comprises or is the curved mirror. The first mirror or the second mirror comprising or being the curved mirror minimizes the number of components in or close to the optical resonator. The minimized number of components can minimize optical losses due to scattering and absorption. For example, the minimized optical losses improve the efficiency of a device comprising the photonic integrated circuit. The minimized optical losses can also improve the finesse of the optical resonator.

For instance, the curved mirror has a radius of curvature of at least 1 μm, in particular 50 μm, or 100 μm, or 300 μm. For instance, the curved mirror has a radius of curvature not exceeding 10 mm, in particular 1 mm, or 500 μm, or 300 μm.

In one embodiment, the focusing or defocusing element comprises a micro lens, a micro beam expander, a coupling grating, or a gradient-index GRIN lens. The successful integration of focusing and/or defocusing elements into photonic integrated circuits has been demonstrated in Dietrich et al. and in Happach et al. In particular, Dietrich et al. demonstrate the integration of beam expanders, whereas Happach et al. demonstrate the integration of GRIN lenses.

In another aspect, the disclosure relates to a device comprising the photonic integrated circuit with some or all of the features described above. For instance, the device may comprise an optical parametric oscillator, a cavity-enhanced photon-pair source, a second-harmonic generator, a difference-frequency generator, or a sum-frequency generator. For instance, the device may be a device for squeezed-light generation, squeezed-state encoding, quantum key distribution, quantum computing, frequency-comb generation, generation of single frequency modes of ultra-narrow bandwidth, wavelength-division multiplexing, sensing, light ranging and detection (LIDAR), spectroscopy, or mid-infrared spectroscopy.

In yet another aspect, the disclosure relates to a method for producing a photonic integrated circuit, the method comprising: providing a first waveguide substrate with a first waveguide, providing a second waveguide substrate with a second waveguide, providing a first mirror comprising a first layered structure on a first mirror substrate, providing a second mirror comprising a second layered structure on a second mirror substrate, forming a first waveguide on the first waveguide substrate, forming a second waveguide on the second waveguide substrate, characterized in that the method comprises the following steps: positioning the first mirror with respect to the first waveguide substrate or the second waveguide substrate, and fixing the first mirror to the first waveguide substrate or the second waveguide substrate, such that the first mirror and the second mirror form end mirrors of an optical resonator, and at least a portion of the first waveguide is within the optical resonator, and the first waveguide substrate is continuous with the second waveguide substrate, and the first waveguide at a first end of the first waveguide is aligned with the second waveguide at a second end of the second waveguide.

The method may comprise all the process steps, but not necessarily in the given order. At least some of the process steps may be performed at an earlier or later point in the method.

According to one embodiment, the method further comprises forming alignment structures on the first mirror substrate or the second mirror substrate. In another embodiment, the method further comprises forming alignment structures on the first waveguide substrate or the second waveguide substrate.

For example, the alignment structures may comprise alignment marks. Positioning the first mirror with respect to the first waveguide substrate or the second waveguide substrate may comprise aligning the first mirror with respect to the first waveguide substrate or the second waveguide substrate according to a visual inspection of the alignment marks.

For example, the alignment structures may comprise alignment slots. Positioning the first mirror with respect to the first waveguide substrate or the second waveguide substrate may comprise aligning the first mirror with respect to the first waveguide substrate or the second waveguide substrate according to at least one mechanical contact point provided by at least one alignment slot.

For instance, forming the first waveguide or the second waveguide can be performed prior to the positioning and the fixing.

For instance, forming the first waveguide or the second waveguide can be performed after the positioning and the fixing. In particular, forming the first waveguide or the second waveguide after the positioning and the fixing can improve the precision of the alignment. In particular, forming the first waveguide or the second waveguide after the positioning and the fixing eliminates a risk of misalignment of the first waveguide and the second waveguide during the positioning and fixing. The improved precision of the alignment may improve the coupling of an electromagnetic wave between the first waveguide and the second waveguide. For example, an improved coupling improves the efficiency of a device comprising the photonic integrated circuit. Eliminating the risk of misalignment can improve the reliability of a production of the photonic integrated circuit.

The method may comprise polishing a section of the first mirror substrate and/or the second mirror substrate to a surface roughness<5 nm, in particular <1 nm.

The method may further comprise depositing the first layered structure or the second layered structure. For instance, depositing the first layered structure or depositing the second layered structure may comprise ion beam sputtering or magnetron sputtering or molecular beam deposition or atomic layer deposition. According to one embodiment, depositing the first layered structure or depositing the second layered structure comprises depositing the first layered structure or depositing the second layered structure on the first waveguide or on the second waveguide.

The method may further comprise removing at least a portion of the first mirror substrate. The method may further comprise removing at least a portion of the second mirror substrate.

The positioning and fixing may comprise a microassembly step or a robotic pick-and-place step. The microassembly step or the robotic pick-and-place step may comprise picking up the first mirror with an automated device. The microassembly step or the robotic pick-and-place step may comprise positioning the first mirror with respect to the first waveguide substrate or the second waveguide substrate, and/or fixing the first mirror to the first waveguide substrate or the second waveguide substrate using an automated device. The microassembly step or the robotic pick-and-place step may comprise positioning the first mirror with a precision of no larger than 10 μm, in particular no larger than 1 μm.

The method may further comprise forming a recess in the first waveguide substrate or the second waveguide substrate, and positioning and fixing the first mirror such that at least a part of the first mirror is in the recess. Positioning the first mirror such that at least a part of the first mirror is in the recess may comprise aligning the first mirror with respect to a side or an edge of the recess.

The method may comprise direct bonding the first waveguide substrate and the second waveguide substrate. The direct bonding may for example comprise surface activated bonding, plasma activated bonding, adhesive bonding, anodic bonding, eutectic bonding, glass frit bonding, thermocompression bonding, or reactive bonding.

The method may further comprise forming an intermediate layer between the first mirror substrate and the first waveguide substrate or the second waveguide substrate. For instance, the intermediate layer may comprise silicon or silicon oxide.

The first mirror substrate may have a thickness of at least 1 mm, in particular of at least 10 mm.

The first waveguide substrate or the second waveguide substrate may have a thickness of at least 1 mm, in particular of at least 10 mm.

The method may further comprise attaching the first waveguide substrate or the second waveguide substrate to an auxiliary substrate with a thickness of at least 1 mm, in particular of at least 10 mm.

A thickness of the first mirror substrate, or the first waveguide substrate, or the second waveguide substrate, or the auxiliary substrate of at least 1 mm, in particular at least 10 mm, makes handling the respective substrate more reliable. In particular, it reduces a risk of unintendedly breaking the respective substrate during the positioning and fixing. The thickness of at least 1 mm, in particular of at least 10 mm, also improves the adhesion between the first mirror substrate and the first waveguide substrate or the second waveguide substrate. The improved adhesion reduces a danger that a joint between the first mirror substrate and the first waveguide substrate or the second waveguide substrate breaks, in particular in the presence of movements or vibrations. For example, the improved adhesion improves the reliability of the production of the photonic integrated circuit. For example, the improved adhesion enhances a lifetime of the photonic integrated circuit. Large thickness substrates typically also show less bowing and warping, i.e. are flatter, which may be favorable with respect to the performance of the device. The thickness of at least 1 mm, in particular of at least 10 mm, also improves a thermal transport between the first mirror substrate and the first waveguide substrate or the second waveguide substrate.

The method may further comprise attaching a heat sink to the first waveguide substrate or to the second waveguide substrate. For instance, a thermal conductivity of the heat sink may be at least 150 W/(m·K).

The heat sink may comprise diamond, silicon carbide, aluminum nitride, copper, silver or gold.

Attaching the heat sink may comprise depositing diamond or silicon carbide by chemical vapor deposition.

The method may further comprise attaching at least two heat sinks to surfaces on opposite sides of the first waveguide substrate.

BRIEF DESCRIPTION OF THE DRAWINGS

The features and numerous advantages of the disclosure will become best apparent from a detailed description of exemplary embodiments with reference to the accompanying drawings, in which.

DETAILED DESCRIPTION

Figure 1:
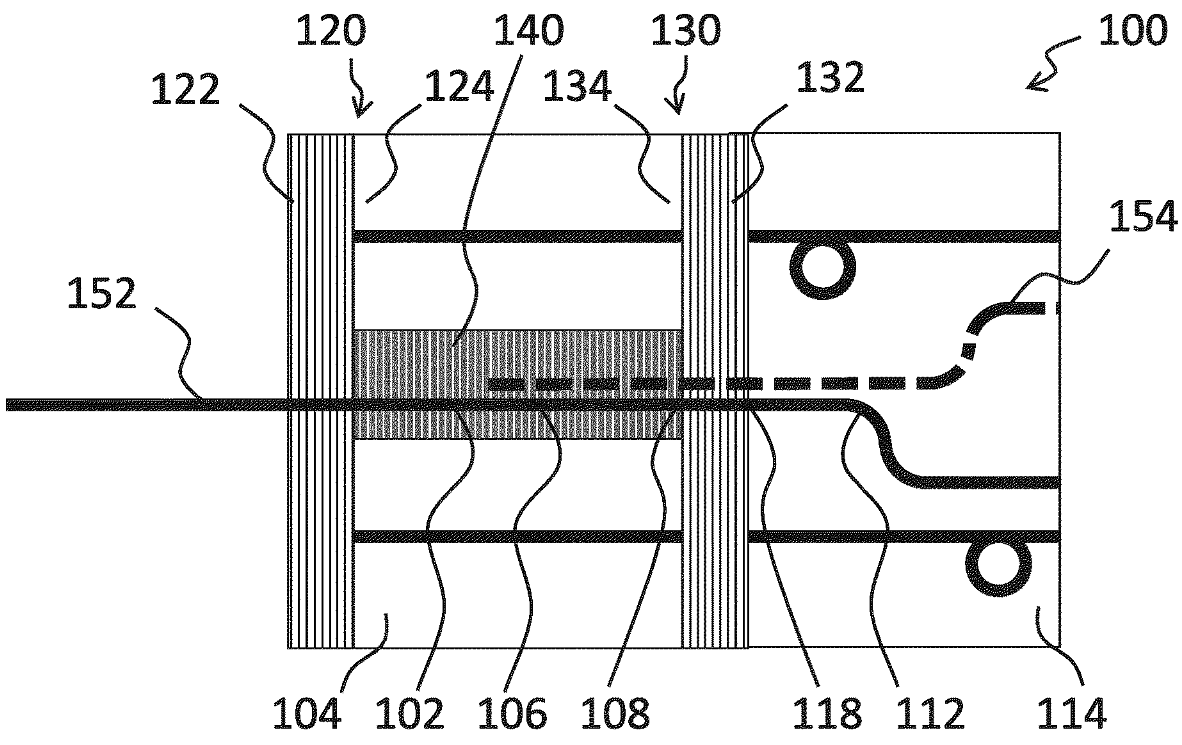
FIG. 1 is a schematic illustration of a top view of the photonic integrated circuit according to one embodiment.

FIG. 1 gives a schematic illustration of a photonic integrated circuit 100 according to one embodiment, which may, for example, be applied as an optical parametric oscillator 460, a cavity-enhanced photon-pair source 462, or a cavity-enhanced source of squeezed light 560. The photonic integrated circuit is shown from a top view. In this embodiment, a first mirror 120 and a second mirror 120 are located on opposite surfaces of a first waveguide substrate 104, which thus serves as a first mirror substrate 124 and a second mirror substrate 134. According to this embodiment, the first waveguide 102 is fully within the optical resonator formed by the two mirrors 120, 130. The first waveguide substrate 104 comprises a nonlinear medium 140, for example lithium niobate, with a portion of the nonlinear medium configured as a nonlinear gain medium, for example by periodic poling to form a section of periodically poled lithium niobate. For example, the first waveguide substrate 104 can be a single crystal of lithium niobate. The lithium niobate may comprise titanium-indiffused lithium niobate. The electric field of an incoming electromagnetic wave 152, which can advantageously be generated in a photonic integrated circuit 100 according to a slightly modified embodiment adapted for second-harmonic generation, is enhanced in the optical resonator. Consequently, the electric field is enhanced in the first waveguide 102, 106 formed in the nonlinear medium. The enhanced field strength enhances the efficiency of a device comprising the nonlinear medium. Advantageously, the periodic poling of the lithium niobate 140 may be optimized for a specific nonlinear optical process to occur at a specified temperature for a specific incoming frequency and incoming polarization. For example, the periodicity can be adapted to support degenerate parametric down conversion for an incoming frequency corresponding to an incoming wavelength of 775 nm. In this case, a seeded or unseeded degenerate parametric downconversion results in an electromagnetic wave 154 with a frequency corresponding to a wavelength of 1550 nm. The photonic integrated circuit 100 can generate an electromagnetic wave 154 that comprises squeezed light, or generate photon pairs. The generated electromagnetic wave 154 may pass through the nonlinear optical medium more than once because of the optical resonator formed by the first mirror 120 and the second mirror 130. Multiple passes of the generated light can be used to seed the nonlinear optical process, which can enhance an output power of the nonlinear optical process, and to implement a device which is referred to as an optical parametric oscillator in the context of this disclosure. The multiple passes can hence be beneficial for the efficiency of a device adapted to support the nonlinear optical process. In particular, the photonic integrated circuit may be applied as a source of intense squeezed light. The multiple passes and the enhanced field strength in the optical resonator can improve the performance of an optical device comprising the photonic integrated circuit, in particular of a source of squeezed light, for example by relaxing the demands on a possible source of optical or electric power which may be needed to operate the optical device. For example, the cost of the source may hence be reduced. An output power of the optical device can be improved. A quality of a squeezing of generated squeezed light can be improved. The improved efficiency of the device also reduces waste heat generated in the device, which may be beneficial for a stability of the generated light and a lifetime of the device.

Figure 2:
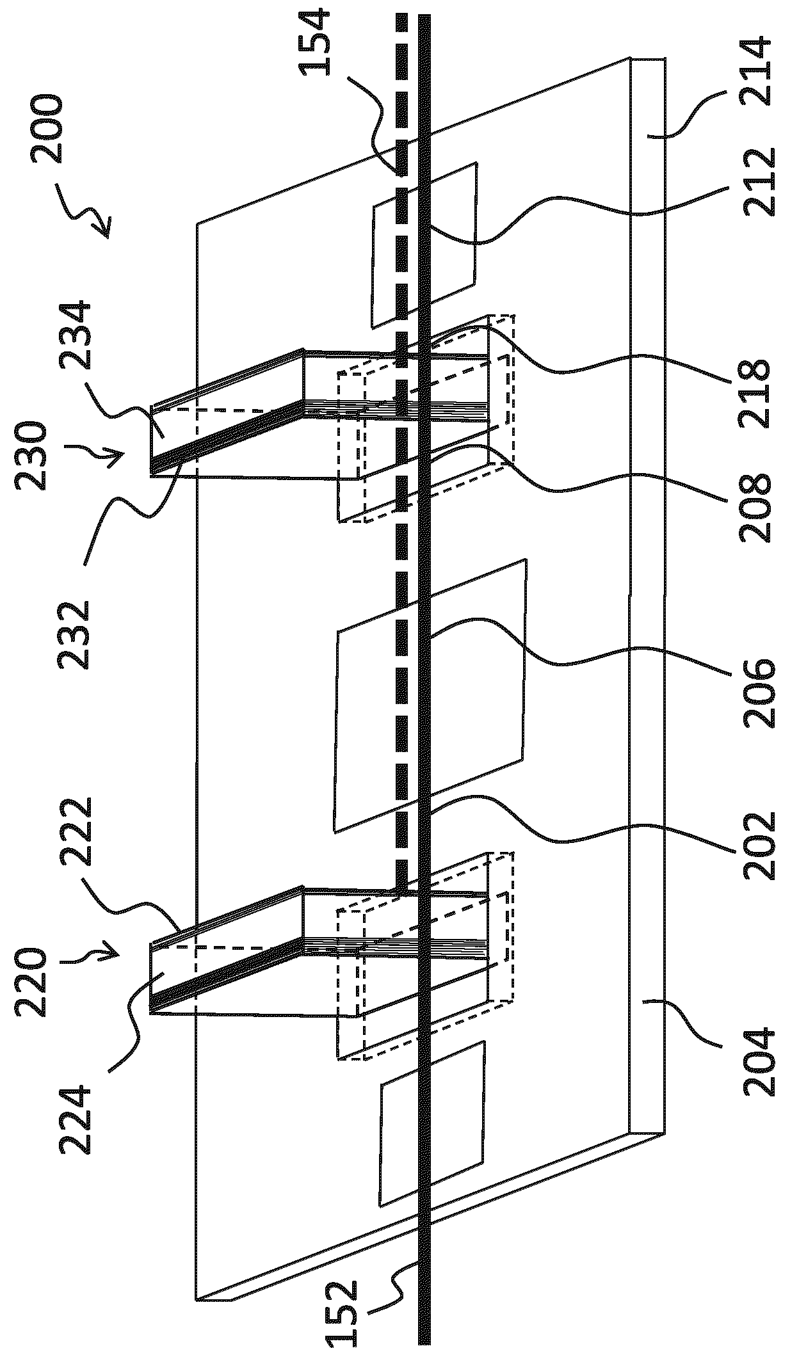
FIG. 2 is a schematic illustration of the photonic integrated circuit according to another embodiment.

FIG. 2 gives a schematic perspective view of a different embodiment of the photonic integrated circuit 200 for, for example, an optical parametric oscillator 460, a cavity-enhanced photon-pair source 462, or a cavity-enhanced source of squeezed light 560. Like in the embodiment illustrated in FIG. 1, also according to the embodiment depicted in FIG. 2 the first mirror 120, 220 and the second mirror 130, 230 form end mirrors of an optical resonator. Like in the other embodiment, a portion 206 of the first waveguide is in the optical resonator. In addition, this embodiment of the photonic integrated circuit 200 can be adapted to support a nonlinear optical process, giving the same advantages as the photonic integrated circuit shown in FIG. 1. According to the embodiment shown in FIG. 2, the first mirror substrate 224 is fixed to the first waveguide substrate 204, and the second mirror 230 is fixed to one of the waveguide substrates 204, 214. In some embodiments, the first mirror substrate 124, 224 is provided by one of the waveguide substrates, whereas the second mirror substrate 234 is fixed to one of the waveguide substrates. In some embodiments, the first mirror 120, 220 and the second mirror 130, 230 are formed on the same mirror substrate, the same mirror substrate acting as the first mirror substrate 124, 224 and the second mirror substrate 134, 234. In this case, the first mirror 120, 220 and the second mirror 130, 230 can be formed on opposite surfaces of the same substrate. This same substrate can then be fixed to the first waveguide substrate 104, 204 or the second waveguide substrate 114, 214.

The photonic integrated circuit 100 may comprise a second waveguide substrate 114 of a material different from the material of the first waveguide substrate 104, thus implementing a hybrid approach to photonic integrated circuits. The hybrid approach has the advantage that the most suitable material of the second waveguide substrate 114 can be selected for a target functionality of the optical components on the second waveguide substrate 114, which can be different from a target functionality of the optical components on the first waveguide substrate 104. This allows for the design of complex photonic integrated circuits. For example, microstructures, waveguides, ring resonators, phase shifters interferometers, beam splitters, delay lines, heat sinks and electronic elements can be on the first waveguide substrate 104 or the second waveguide substrate 114 whichever has a more suitable material for the component. Additional waveguides and ring resonators are shown in the photonic integrated circuit 100 in FIG. 1 as examples. An additional third waveguide substrate or more waveguide substrates, possibly comprising a third or more different materials, can be continuous with the first waveguide substrate 104 or the second waveguide substrate 114, forming a single chip. The chip can combine multiple materials, wherein each one may be best-suited for a specific functionality.

According to the embodiment shown in FIG. 1, the second layered structure 132 of the second mirror 130 is fully enclosed in a continuous chip formed by the first waveguide substrate 104 and the second waveguide substrate 114. This embodiment may result in an efficient optical coupling between the first waveguide and the second waveguide, as it minimizes the optical losses, for example scattering losses, associated with the optical coupling. The efficient optical coupling can improve the quality of the squeezing of a squeezed light, which can be generated in a portion of the first waveguide. The efficient coupling is also beneficial for a high finesse of the optical resonator, which can be an advantage in some applications. The continuous chip may also result in a high heat conduction between the second mirror 120 and the first waveguide substrate 104 and the second waveguide substrate 114. The first mirror 120 and the second mirror 130 are in physical contact with the nonlinear medium for a high heat conduction also between the nonlinear medium and the mirrors 120, 130. The efficient transport of heat away from the nonlinear medium and the first mirror 120 and the second mirror 130 into the first waveguide substrate 104 and the second waveguide substrate 114 may be an advantage in applications which require a high thermal stability and homogeneity. For example, this may be the case in the generation of squeezed light with a high intensity of the pump light. Advantageously, the heat transport away from the first waveguide substrate 104 and the second waveguide substrate 114 is facilitated by using heat sinks that are attached close to or are in contact with the components in which heat originates.

The first waveguide 102, 202 and the second waveguide 112, 212 are aligned with respect to each other at corresponding ends. In particular, one end 108, 208 of the first waveguide neighbors one end 118, 218 of the second waveguide 112, 212. The alignment is such that an extension of an axis of the first waveguide 102, 202 at an end 108, 208 of the first waveguide coincides with an axis of the second waveguide 112, 212 at an end 118, 218 of the second waveguide. This way, light can couple directly along a straight line from the first waveguide 102, 202 to the second waveguide 112, 212. This avoids coupling elements that would otherwise be needed for compensating angular misalignment. In some known integrated photonic circuits, coupling elements are comprised to compensate an angular misalignment or to bridge a significant gap between the axis of the first waveguide 102, 202 and the axis of the second waveguide 112, 212 at their corresponding ends or control the divergence of a light beam. Avoiding coupling elements reduces optical losses due to scattering and absorption in the coupling elements and at interfaces of the coupling element. This improves the efficiency of devices comprising the photonic integrated circuit. The reduced optical losses due to scattering and absorption also increase the finesse of the optical resonator, which is an advantage in many devices in which the photonic integrated circuit can be applied. The increased finesse results in a higher electric field strength inside the optical resonator and a sharper resonance profile of the optical resonator. This is an advantage in narrow-linewidth applications using the photonic integrated circuit. Moreover, avoiding the coupling elements reduces the complexity of producing the photonic integrated circuit, as fewer components are produced and/or placed with a high accuracy. Avoiding coupling elements also reduces the cost of producing the photonic integrated circuits and improves the reliability of the production. Moreover, the mechanical integrity and rigidity is improved, as fewer components can move with respect to each other, for example in the presence of a mechanical vibration. For an efficient coupling, the end 108, 208 of the first waveguide and the end 118, 218 of the second waveguide are located in enclosed vicinity of one another in one embodiment. In particular, the end 108 of the first waveguide can be in direct contact with the first mirror 120 or the second mirror 130, and the end 118 of the second waveguide can also be in direct contact with the first mirror 120 or the second mirror 130, thus minimizing the distance in between them to a minimal distance given by a thickness of the first mirror 120, 220 or the second mirror 130, 230.

Figure 3A:
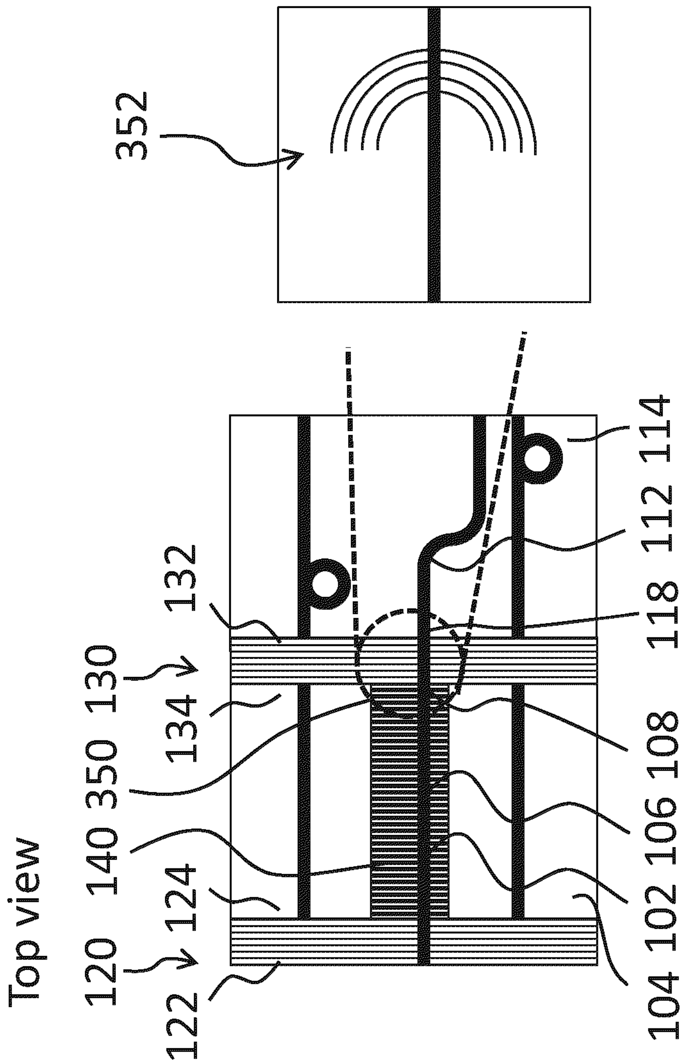
FIG. 3 gives schematic illustrations of a top view of the photonic integrated circuits with focusing or defocusing elements according to yet another embodiment.
Figures 3B, 3C, 3D:
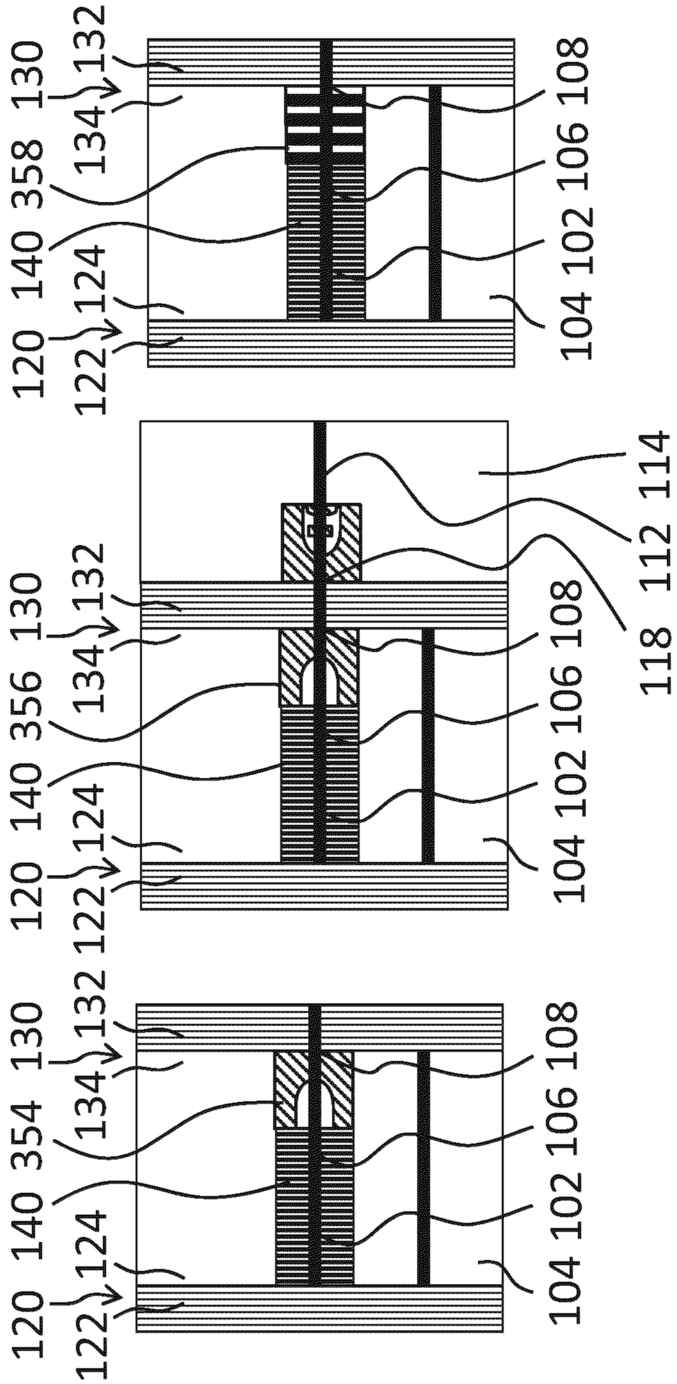

FIG. 3 illustrates another embodiment of the photonic integrated circuit, comprising a focusing or defocusing element 350 between the first waveguide 102 the second waveguide 112. The focusing or defocusing element may improve the coupling between the first waveguide 102, 202 and the second waveguide 112, 212. For example, the embodiments illustrated in FIG. 3 comprise as a focusing or defocusing element a micro-lens 352, 354 as shown in FIG. 3A and FIG. 3B, a micro beam expander 356 as shown in FIG. 3C, or a coupling grating 358 or a GRIN lens 358 as shown in FIG. 3D. In one embodiment, illustrated in FIG. 3A, the first mirror 120 or the second mirror 130 comprises or is the curved mirror 350, 352. This minimizes the number of optical components in the optical resonator or close to the optical resonator, which could act as sources of scattering and/or absorption. In some embodiments, the curved mirror has a radius of curvature of 100 μm to 300 μm. The curved mirror can have any shape, including spherical, cylindrical, parabolic, or the shape of a general Cartesian oval. Parabolic and Cartesian oval shapes may be an advantage as the radius of curvature may not be much larger than the diameter of a beam of incoming radiation in an application, provoking spherical aberration. The parabolic and Cartesian oval shapes compensate the spherical aberration. The focusing or defocusing element can be configured to maximize the stability of the optical resonator. Moreover, the focusing or defocusing element can be configured to maximize the finesse of the optical resonator. In another embodiment, a space between the first waveguide 102 or the second waveguide 112 and the first mirror 120 or the second mirror 130 comprises vacuum or a filler material. The filler material reduces the difference in the optical index of refraction at an interface of the first waveguide 102 or the second waveguide 112. This further improves the coupling between the first waveguide 102 and the second waveguide 112. The first mirror substrate 124 or the second mirror substrate 134 may further exhibit at least one layered structure. The first mirror substrate can for example support an antireflection coating, an optical bandpass filter, an optical short pass filter, or an optical long pass filter. In particular, the antireflection coating can improve the coupling between the first waveguide and the second waveguide, for example by reducing reflection losses of a pump light or a generated light.

In one embodiment, the first waveguide 102, 202 or the second waveguide 112, 212 comprises lithium niobate, silicon, silicon oxide, aluminum arsenide, gallium arsenide, aluminum gallium arsenide, or silicon nitride, but the first waveguide 102, 202 or the second waveguide 112, 212 may be composed of any semiconductor or dielectric that is now known or developed in the future. In an embodiment, the first waveguide 102, 202 or the second waveguide 112, 212 comprises titanium-indiffused lithium niobate or silicon-indiffused silicon oxide. Also, in one embodiment, the first waveguide substrate 104, 204 or the second waveguide substrate 114, 214 comprises lithium niobate, silicon, silicon oxide, aluminum arsenide, gallium arsenide, aluminum gallium arsenide, or silica nitrite, but the first waveguide substrate 104, 204 or the second waveguide substrate 114, 214 may be composed of any semiconductor or dielectric that is now known or developed in the future. The first waveguide substrate 104, 204 or the second waveguide substrate 114, 214 can comprise crystalline material, for example in the form of a wafer.

The first layered structure 122, 222 or the second layered structure 132, 232 each comprise at least one layer of material different from the first waveguide substrate 104, 204 and the second waveguide substrate 114, 214. The first layered structure 122, 222 or the second layered structure 132, 232 may comprise alternating layers of materials with a low index of refraction and materials with a high index of refraction. This combination ensures a high reflectivity (>98%, >99%, >99.5%, >99.9%, or >99.99%). A material forming a layer of the layered structure may comprise an oxide or a halide or a chalcogenide or a III-V-semiconductor, for example $TiO_2$, $SiO_2$, $MgF_2$, $Ta_2O_5$, ZnSe, $YF_3$, AlGaAs, GaAs, AlAs, AlAsSb, or GaSb. The layers may also be composed of any other semiconductor or dielectric that is now known or developed in the future. The first layered structure 122, 222 and the second layered structure 132, 232 can have thicknesses below 30 μm, in particular below 20 μm. The thicknesses can be at least 1 μm, in particular at least 5 μm. The first layered structure 122, 222 or the second layered structure 132, 232 can comprise a metal layer e.g. gold, silver, or aluminum coating). A metal layer has the advantage that it can be produced economically, while providing a reflectivity >85%, >90%, or >95%. A section of the mirror substrate can have a roughness of RMS<5 nm, in particular <1 nm. In particular, this may be useful for producing ultra-high performance mirrors (reflectivity exceeding 99.99%), while for all other applications (reflectivity >98%, >99%, >99.5%, or >99.9%) industrial grade polishing can possibly be employed. A deposited layer may comprise an epitaxial semiconductor layer, wherein the material forming the epitaxial layer can be the same or different from the material forming the substrate. A first mirror 120, 220 or a second mirror 130, 230 which comprises the epitaxial layer can have a reflectivity >99.9% or >99.99%. Mirrors comprising an epitaxial semiconductor layer usually comprise a mirror substrate that comprises crystalline material.

The first layered structure 122, 222 and/or the second layered structure 132, 232 thus achieve a high reflectivity of the first mirror 120, 220 and the second mirror 130, 230. The high reflectivity results in a high finesse of the optical resonator. The combination of a high finesse and a short length of the optical resonator is an advantage over existing ring resonators, for example when the photonic integrated circuit is used for generating single frequency modes of ultra-narrow bandwidth or for wavelength-division multiplexing.

Moreover, the reflectivity and transmittance of the first mirror 120, 220 and/or the second mirror 130, 230 can easily be adjusted according to the requirements of a specific application by designing the first layered structure 122, 222 and/or the second layered structure 132, 232 correspondingly. The first layered structure 122, 222 and/or the second layered structure 132, 232 can have a transmittance of at least 1%, in particular at least 25%, or at least 40%. The transmittance of the first layered structure 122, 222 and/or the second layered structure 132, 232 can be used to couple the incoming electromagnetic wave into the optical resonator, or to couple the generated electromagnetic wave out of the optical resonator.

The reflectivity and transmittance of the first mirror 120, 220 and the reflectivity and transmittance of the second mirror 130, 230 can be configured for impedance matching. In particular, the reflectivity and transmittance of the first mirror 120, 220 and the reflectivity and transmittance of the second mirror 130, 230 can be configured such that a light power transmitted through the first mirror 120, 220 or the second mirror 130, 230 is at most as high as a light power dissipated during a round trip in the optical resonator. The reflectivity and transmittance can be adjusted individually for each frequency of an electromagnetic wave in the presence of multiple frequencies of at least one electromagnetic wave, for example if an incoming frequency differs from a generated frequency in the device using the photonic integrated circuit, or in case of multiple, differing incoming frequencies or multiple, differing generated frequencies.

The first mirror substrate 124, 224 or the second mirror substrate 134, 234 can be composed of materials which are the same or different from the material of the first waveguide substrate 104, 204 or the second waveguide substrate 114, 214. In one embodiment, the first mirror substrate 124, 224 or the second mirror substrate 134, 234 comprises lithium niobate, silicon, silicon oxide, aluminum arsenide, gallium arsenide, aluminum gallium arsenide, or silicon nitride, but the first mirror substrate 124, 224 or the second mirror substrate 134, 234 may be composed of any semiconductor or dielectric that is now known or developed in the future. In one embodiment, a portion of the first layered structure 122 or the second layered structure 132 is embedded within a continuous body formed by the first waveguide substrate 104 and the second waveguide substrate 114 as illustrated in FIG. 1. In another embodiment, the first layered structure 122 or the second layered structure 132 is fully embedded within the continuous body formed by the first waveguide substrate 104 and the second waveguide substrate 114 as illustrated in FIG. 1. In another embodiment, at least a portion of the first layered structure 222 or the second layered structure 232 is below a top surface of the first waveguide substrate 204 or the second waveguide substrate 214 as illustrated in FIG. 2. In an embodiment, the layers of the first layered structure 122, 222 or the layers of the second layered structure 132, 232 are perpendicular to a top surface of the first waveguide substrate 104, 204 or a top surface of the second waveguide substrate 114, 214.

The first waveguide 102, 202 can comprise a nonlinear medium. The photonic integrated circuit with the nonlinear optical medium has the advantage that the strength of an electromagnetic wave in the waveguide is enhanced due to the transverse confinement in the waveguide and the confinement along the optical axis in the optical resonator enhances. The enhanced strength of the electromagnetic field improves the efficiency of a device which comprises the optical resonator, in particular of a device adapted to support a nonlinear optical process mediated by the nonlinear optical medium. For example, a required optical or electrical input power or pump power is reduced, an amount of generated heat is reduced, a generated optical output power is improved, or a squeezing of a generated light is improved. The nonlinear medium can for example comprise BBO, LBO, KDP, KTP, KTA, KBBF, BiBO, CLBO, KTA, GaAs, $AgGaS_2$, ZnTe, InP, GaSe, CdTe, CdZnTe, $LiTaO_3$, or $LiNbO_3$. The nonlinear optical medium can alternatively comprise any nonlinear optical material that is now known or developed in the future. The nonlinear optical medium may for example be adapted to support parametric down conversion, second harmonic generation, sum frequency generation, difference frequency generation, four-wave mixing, optical parametric amplification, optical parametric oscillation, white-light generation, Kerr lensing, two-photon absorption, multi-photon absorption, or stimulated amplified emission. In an embodiment, the nonlinear optical medium has a non-vanishing Chi2 nonlinearity. This is realized in nonlinear optical media without inversion symmetry. In an embodiment, the nonlinear optical medium without inversion symmetry is ferroelectric. For example, the nonlinear optical medium can comprise lithium niobate, in particular it can comprise titanium-indiffused lithium niobate. The lithium niobate can comprise periodically poled lithium niobate 140. Periodic poling of the ferroelectric domains in periodically poled lithium niobate 140 allows for tuning phase matching conditions of the nonlinear optical medium. By tuning the phase matching conditions, the nonlinear optical medium can be configured to support a specified nonlinear optical process, or can be configured to support nonlinear optical processes for specified frequencies of electromagnetic waves, or can be configured to support a nonlinear process at a specified temperature. This flexibility is advantageous in applications, as it enables an average expert in the field to design a photonic integrated circuit for a specific application.

In an embodiment, the nonlinear optical medium is adapted to support a nonlinear optical process comprising a frequency conversion. In an embodiment, the frequency conversion comprises at least one incoming electromagnetic wave 152 with an incoming frequency and at least one generated electromagnetic wave 154 with a generated frequency, and the generated frequency is different from the incoming frequency. In one embodiment, the generated frequency is smaller than the incoming frequency. For example, this is achieved by employing parametric down conversion, optical parametric amplification, optical parametric oscillation, or four-wave mixing as a nonlinear optical process. In another embodiment, at least one generated frequency is the double of at least one incoming frequency. For example, this can be achieved using second harmonic generation in the nonlinear optical medium. The optical resonator can be configured to enhance a field strength of the incoming electromagnetic wave 152 inside the optical resonator compared to a field strength of the incoming electromagnetic wave 152 outside the optical resonator. The enhanced field strength can advantageously increase the efficiency of a device which comprises the optical resonator and is adapted to support the nonlinear optical process. In one embodiment, the generated electromagnetic wave 154 passes through the portion 106, 206 of the first waveguide inside the optical resonator more than once, realizing a multi-pass geometry. In the multi-pass geometry, the generated electromagnetic wave 154 can further seed the nonlinear optical processes. This increases the efficiency of a device comprising the optical resonator further. The increased efficiency improves the performance of the device for example by relaxing the requirements with respect to a source of optical or electrical pump power, thereby reducing the technical requirements towards the device and its cost. The increased efficiency also improves the squeezing of squeezed light which can be generated in the nonlinear optical process.

The incoming frequency of the incoming electromagnetic wave 152 can be in the UV, or the visible, or the infrared spectral range, with a wavelength of at least 200 nm, in particular 400 nm. The wavelength may be at most 10 μm, in particular at most 1600 nm. Depending on the specific incoming frequency or frequencies, and depending on the generated frequency or frequencies, specific materials of the first waveguide 102, 202 or the second waveguide 112, 212 may need to be employed. In particular, the material of the first waveguide 102, 202 and the second waveguide 112, 212 should exhibit a high transparency to the incoming frequency or the generated frequency. The photonic integrated circuit advantageously provides the flexibility to employ a wide selection of materials such that the wavelength range may be tailored to a specific application. In particular, the incoming frequency can be in the wavelength range from 840 to 860 nm, from 1300 to 1320 nm, from 1370 to 1390 m, or from 1540 to 1560 nm. Advantageously, an incoming electromagnetic wave 152 of such a wavelength is transported efficiently in commonly used optical fibers. Using such an incoming frequency allows to integrate the photonic integrated circuit into extended optical devices. In one embodiment, the incoming frequency can be in the wavelength range from 420 to 430 nm, from 650 to 660 nm, from 685 to 695 nm, or from 770 to 780 nm, in particular in the wavelength range from 770 to 780 nm. Using such an incoming frequency in combination with degenerate parametric down conversion results in generated frequencies, which can advantageously be transmitted with low loss in commonly used optical fibers. In another embodiment, the incoming frequency can be in the wavelength range from 1640 to 1680 nm, from 1680 to 1720 nm, from 2600 to 2640 nm, or from 3080 to 3120 nm, in particular in the wavelength range from 3080 to 3120 nm. Using such an incoming frequency in combination with frequency-doubling or second-harmonic generation results in generated frequencies, which can advantageously be transmitted with low loss in commonly used optical fibers.

The generated frequency of the generated electromagnetic wave 154 can be in the UV, or the visible, or the infrared spectral range, with a generated wavelength of at least 200 nm, in particular 400 nm. The generated wavelength may be at most 10 μm, in particular at most 1600 nm. In particular, the generated frequency can correspond to a wavelength range from 840 to 860 nm, from 1300 to 1320 nm, from 1370 to 1390 m, or from 1540 to 1560 nm. Advantageously, a generated electromagnetic wave 154 of such an outgoing frequency is transported efficiently and commonly used optical fibers. Using such an outgoing frequency allows to integrate the photonic integrated circuit into extended optical devices, for example for providing the incoming electromagnetic wave 152 or for processing the generated electromagnetic wave 154. In an embodiment, the generated wavelength is between 1540 and 1560 nm.

Figure 5A:
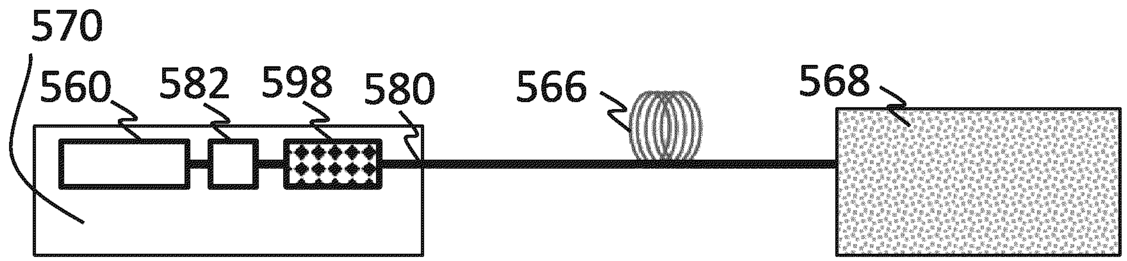
FIG. 5 illustrates optical devices using a squeezed-light source based on the photonic integrated circuit.

In one embodiment, the generated electromagnetic wave 154 comprises electromagnetic wave in a squeezed state. The combined confinement along the transverse direction by the waveguide 106, 206 comprising a nonlinear optical medium and along the optical axes by the optical resonator 120, 220, 130, 230 enhances the field strength of an incoming electromagnetic wave 152 and improves the quality of the squeezing. Moreover, the continuous first waveguide substrate 104, 204 and second waveguide substrate 114, 214 provide a mechanically robust and rugged platform for squeezed light generation and for coupling squeezed light between the different components of an optical device, in particular a photonic integrated circuit. Moreover, the first mirror 120, 220 and the second mirror 130, 230 comprising at least one layer of material different from a material of the first waveguide substrate 104, 204 and the second waveguide substrate 114, 214 allow for a high finesse of the optical resonator, further improving the quality of the squeezing. The photonic integrated circuit can hence be applied for the generation of high quality or high intensity squeezed light, giving advantages in applications such as squeezed-state encoding 570, quantum key distribution 572, quantum computing 574, or wavelength-division multiplexing. Some exemplary applications that the photonic integrated circuit can advantageously be applied in are illustrated in FIG. 5.

According to the embodiments shown in FIG. 1 and FIG. 2, the first waveguide is completely inside the optical resonator formed by the first mirror 120, 220 and the second mirror 130, 230. According to the embodiment shown in FIG. 1, the length of the optical resonator matches the length of the first waveguide. The first layered structure 122, 222 and/or the second layered structure can be in physical contact with the first waveguide 102, 202 to minimize the length of the optical resonator. This can be achieved by depositing the first layered structure 122, 222 or the second layered structure 132, 232 directly onto the first waveguide 102, 202. According to the embodiment shown in FIG. 2, a gap may exist between the first mirror or the second mirror and the first waveguide, such that the length of the optical resonator slightly exceeds the length of the first waveguide. In some embodiments, the length of the optical resonator does not exceed the length of the portion 106, 206 of the first waveguide inside the optical resonator by a factor of 10, in particular of 3, or 1.5. According to some embodiments, the length of the optical resonator may not exceed 1 m, or 100 mm, or 50 mm, or 20 mm. A longer optical resonator provides better selectivity. A short length of the optical resonator results in a compact design with the advantage of reducing optical loss. As an additional advantage, an optical resonator with a short length emits a frequency comb with a large spectral spacing. The large spectral spacing allows for selecting a single frequency, for example using bandpass filtering or frequency selective homodyne detection. In one embodiment, the photonic integrated circuit comprises an optical bandpass filter, or an optical short pass filter, or an optical long pass filter located between the first waveguide 102, 202 and the second waveguide 112, 212. By selecting a single frequency from the frequency comb using the bandpass filter, an ultra-narrow bandwidth can be achieved, which is an advantage in some applications. A large spectral spacing also allows for wavelength-division multiplexing of the frequency modes into individual spatial modes for separate processing of the individual spatial modes. Therefore, the first waveguide substrate 104, 204 or the second waveguide substrate 114, 214 can comprise an array of waveguides or a phase array, which can be adapted to serve as a monochromator or a spectroscope. On the other hand, a larger length of the optical resonator can enhance the interaction length of a process related to an interaction between light and matter in the optical resonator. An enhanced interaction length can enhance the efficiency of a device which comprises the optical resonator and is adapted to support the process, which can for example comprise the generation of light during the interaction. A short length of the optical resonator can be used, for example if the photonic integrated circuit is used in combination with a pulsed light source. A short length of the optical resonator reduces the dispersion inside the optical resonator and can improve a pulse duration of a generated light pulse.

A typical width of the first waveguide 102, 202 or the second waveguide 112, 212 may be at least 10 nm, in particular 500 nm, or 1 μm, or 2 m. In one embodiment, the width of the first waveguide 102, 202 or the second waveguide 112, 212 does not exceed 1 mm, in particular 300 μm, or 50 μm, or 10 μm, or 8 μm. This width is optimized for applications with electromagnetic radiation in the ultraviolet, the visible and the infrared spectral range. Different widths are possible, optimized for the application and the wavelength range used. A tapered shape of the first waveguide 102, 202 or the second waveguide 112, 212 is possible, for example to improve the coupling between the first waveguide 102, 202 and the second waveguide 112, 212. A part of the first waveguide 102, 202 may be embedded in the first waveguide substrate 104, 204. A part of the first waveguide 102, 202 may protrude from the first waveguide substrate 104, 204. A part of the second waveguide 112, 212 may be embedded in the second waveguide substrate 114, 214. A part of the second waveguide 102, 202 may protrude from the second waveguide substrate 114, 214.

The first waveguide 102, 202 and the first waveguide substrate 104, 204 may form one integral piece. Also the second waveguide 112, 212 and the second waveguide substrate 114, 214 may form one integral piece. In a monolithic approach, illustrated in FIG. 2, the first waveguide substrate 204 and the second waveguide substrate 114, 214 form an integral piece. This approach optimizes the mechanical rigidity of the photonic integrated circuit and hence its resilience to unintended movements such as vibrations. The monolithic approach also ensures that the first waveguide substrate 204 and the second waveguide substrate 114, 214 can be processed together using the same processing techniques. This facilitates the fabrication of the photonic integrated circuit and reduces its cost. The monolithic approach can also be used to ensure the alignment of the first waveguide 102, 202 and the second waveguide 112, 212, by initially producing both of them as a continuous waveguide and at a later step separating them by a recess in the waveguide.

In another embodiment, consistent with the schematic illustration in FIG. 1, the first waveguide substrate 104 and the second waveguide substrate 114 are fixed to one another. In this case, the first waveguide substrate 104 and the second waveguide substrate 114 can be composed of different materials, consistent with a hybrid approach to photonic integrated circuits. In the hybrid approach, the best materials for specific functionalities can be combined. This may be an advantage in some applications, as it allows for combining various functionalities on a single chip using optimized materials for each of the functionalities. More than two materials can be combined into one photonic integrated circuit. This may be an advantage if more than two functionalities are to be combined in the photonic integrated circuit.

A thickness of the first waveguide substrate 104, 204 or the second waveguide substrate 114, 214 may exceed 1 mm, in particular 10 mm. A larger thickness makes the production process more reliable, as it reduces the risk of an unintended breaking of the first waveguide substrate 104, 204 or the second waveguide substrate 114, 214 in the production process. A larger thickness also improves the adhesion of the first waveguide substrate 104, 204 to the second waveguide substrate 114, 214 in embodiments in which the first waveguide substrate 104, 204 is fixed to the second waveguide substrate 114, 214. The improved adhesion improves the rigidity and ruggedness of the photonic integrated circuit in the presence of mechanical vibrations. This enhances the lifetime of the photonic integrated circuit. Large thickness substrates typically also show less bowing and warping, i.e. are flatter, which may be favorable with respect to the performance of the device. This also improves the heat dissipation within the photonic integrated circuit. A small thickness is possible if material is to be saved and the production cost is to be reduced. In particular, the thickness can be reduced in embodiments where the first mirror 120, 220 or the second mirror 130, 230 is fixed to the first waveguide substrate 104, 204 or the second waveguide substrate 114, 214, as illustrated in FIG. 2.

A width of the first waveguide substrate 104, 204 or the second waveguide substrate 114, 214 may exceed 1 mm, in particular 10 mm. In some embodiments, a length and a width of the first waveguide substrate 104, 204 or the second waveguide substrate 114, 214 exceed 1 mm, in particular 10 mm. A larger width or a large width and length of the first waveguide substrate 104, 204 or the second waveguide substrate 114, 214 allow for the co-integration of more additional components on the photonic integrated circuit, as illustrated for some example optical applications in FIG. 4 and FIG. 5. A smaller width and/or length of the first waveguide substrate 104, 204 or the second waveguide substrate 114, 214 is possible if material is to be saved to reduce a cost of production of the photonic integrated circuit or to simplify the co-integration with electrical, photonic, or micro-electro-mechanical integrated circuits.

The design of the photonic integrated circuit advantageously permits the integration of additional optical resonators, which share with the resonator device, or at least with a portion of the resonator device, one chip formed by the continuous first waveguide substrate 104, 204 and the second waveguide substrate 114, 214. In one embodiment, a third mirror with a third mirror substrate forms an end mirror of a second optical resonator, and the third mirror substrate is provided by or fixed to the chip. In another embodiment, also a fourth mirror substrate of a fourth mirror forming an end mirror of the second optical resonator is provided by or fixed to the chip. The photonic integrated circuit can comprise a third waveguide, with at least a portion of the third waveguide in the second optical resonator. In yet another embodiment, the third waveguide is in contact with the chip, so that it is in contact with the first waveguide substrate 104, 204 or the second waveguide substrate 114, 214. A fourth waveguide can be aligned at a fourth end of the fourth waveguide with the third waveguide at a third end of the third waveguide. The integration of multiple optical resonators in one photonic integrated circuit is not limited to two optical resonators in a single photonic integrated circuit, but a multitude of resonators can in a straightforward way be integrated in the same photonic integrated circuit. In an advanced application, tens or hundreds or thousands of optical resonators or even more may be integrated in the same photonic integrated circuit. In some embodiments, both end mirrors or only one end mirror of an additional optical resonator or multiple additional optical resonators are/is in contact with the first waveguide substrate 104, 204 or the second waveguide substrate 114, 214. One embodiment comprises an additional waveguide at least part of which is located within an additional optical resonator. The additional waveguide may comprise an additional nonlinear optical medium. The additional nonlinear optical medium may be configured to support parametric down conversion, second harmonic generation, sum-frequency generation, difference-frequency generation, four-wave mixing, optical parametric amplification, optical parametric oscillation, white-light generation, Kerr lensing, two-photon absorption, or multi-photon absorption. The waveguide within an additional optical resonator of the additional optical resonator can be in contact with the first waveguide substrate 104, 204 or the second waveguide substrate 114, 214 in one embodiment. Additional waveguides can be aligned at their ends with corresponding ends of waveguides which are at least partially located within the additional optical resonators.

Figures 4A, 4B, 4C:
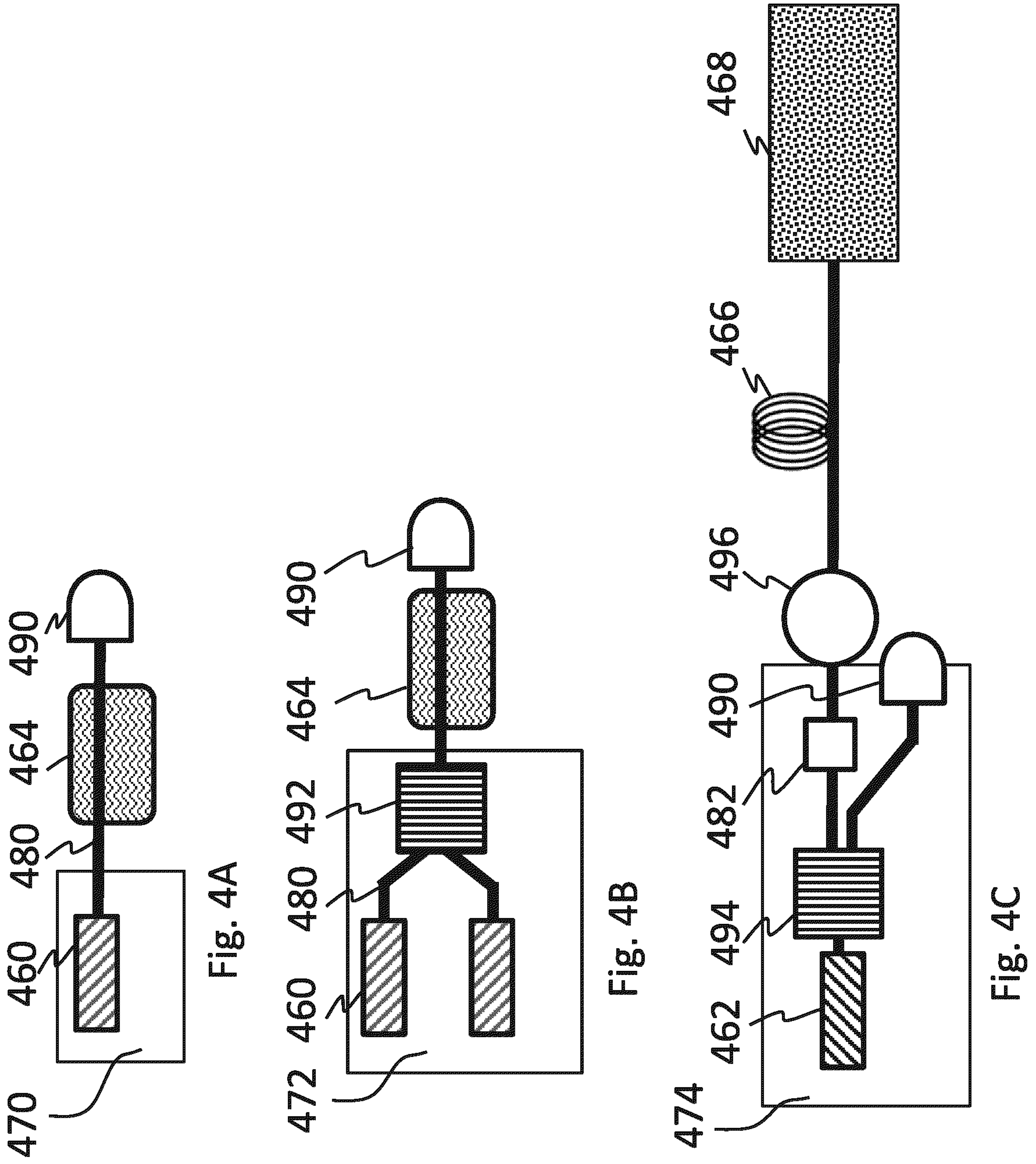
FIG. 4 illustrates optical devices using an optical parametric oscillator or a single-photon source based on the photonic integrated circuit.

FIG. 4 and FIG. 5 illustrate examples of optical devices comprising one or more photonic integrated circuits 100, 200. In particular, FIG. 4 shows devices in which the photonic integrated circuit 100, 200 serves as or is comprised in an optical parametric oscillator 460 or a photon-pair source 462. FIG. 4A and FIG. 4B illustrate devices for frequency-comb spectroscopy 470, 472 in particular devices for single-comb spectroscopy 470 or dual-comb spectroscopy 472. Accordingly, a photonic chip 470 comprises one optical parametric oscillator 460 with at least one photonic integrated circuit 100, 200, or two optical parametric oscillators 460 with at least two photonic integrated circuits 100, 200. In case of two or more optical parametric oscillators, a multiplexer 492 combines the generated light from the two optical parametric oscillators. Waveguides 480 are used to guide the light on the chip. The light then passes through a sample 464 that the spectroscopy is performed on and is detected in a detector 490. The detectors 490 may perform a homodyne detection. All detectors 490 may be co-integrated on the same chip as the photonic integrated circuit, or the detectors 490 may all be separate from the chip 470, 472 with the photonic integrated circuit as shown in FIG. 4A or 4B, or at least one of the detectors 490 may be co-integrated while at least one of the detectors 490 is separate from the chip 470, 472. The sample 464 may comprise a gas cell. The sample 464 may be on the same chip 470, 472 as the photonic integrated circuit, or the sample 464 may be separate from the chip as shown in FIG. 4A or 4B. The sample 464 or at least a portion of the sample 464 may be inside of a signal-enhancing optical resonator. The signal-enhancing optical resonator allows for multiple passes of an electromagnetic wave through the sample 464. The signal-enhancing resonator may be or comprise a photonic integrated circuit according to Claim 1.

Figure 4D:
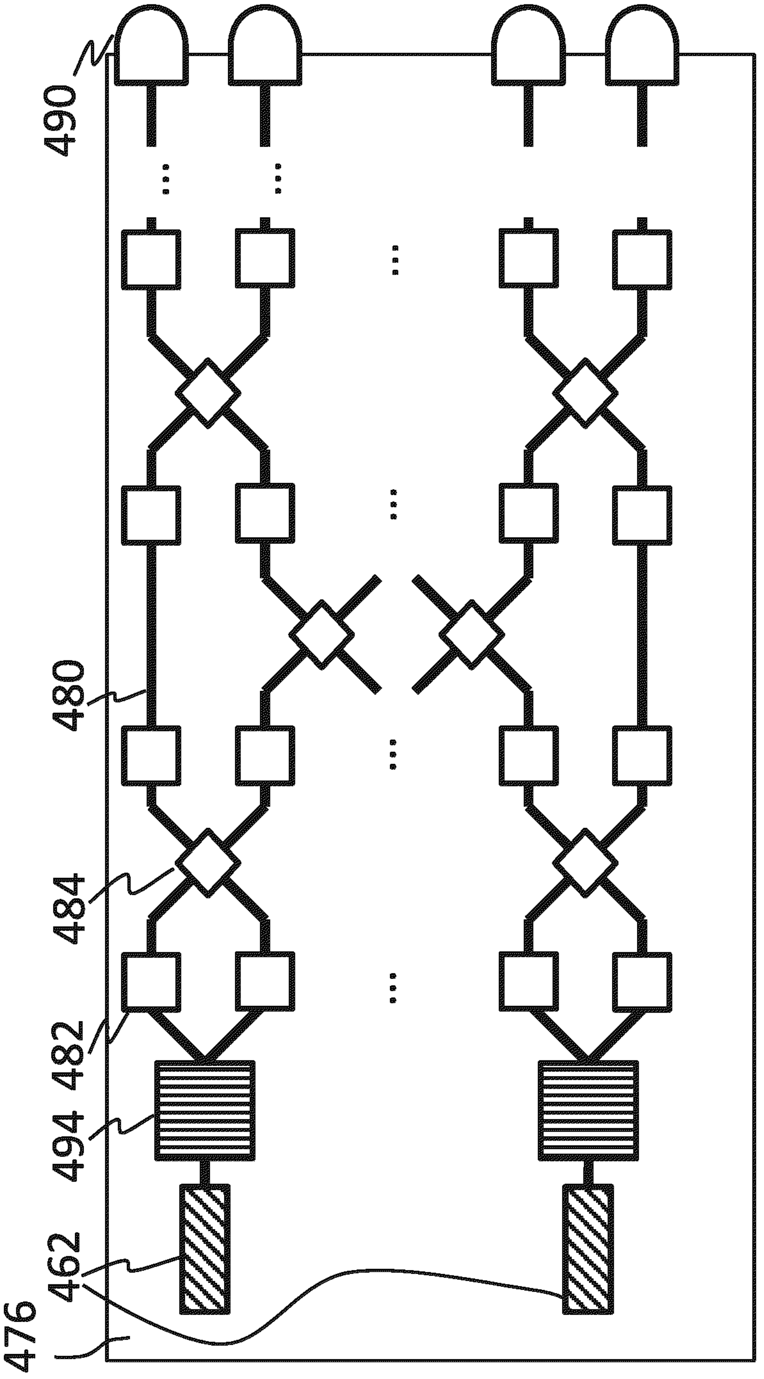

FIG. 4C and FIG. 4D show a device in which the photonic integrated circuit 100, 200 serves as or is comprised in a photon-pair source 462. In particular, FIG. 4C illustrates a device for quantum-key distribution 474. The generated light from the photon-pair source 462 passes through a demultiplexer 494, and one portion of the light is detected on a reference photodetector 490. The other portion is sent, possibly after passing through a phase shifter 482 and a polarization controller 496, into a channel 466 for distribution. It is finally detected by a receiver 468 at another end of the channel.

FIG. 4D illustrates a device for quantum computing with photon pairs. A photonic chip 476 comprises several photon-pair sources 462, each being or comprising a photonic integrated circuit 100, 200. After passing a demultiplexer 494, the photon pairs are combined in a network of phase shifters 482 and beam splitters 484 to finally reach detectors 490.

Figure 5B:
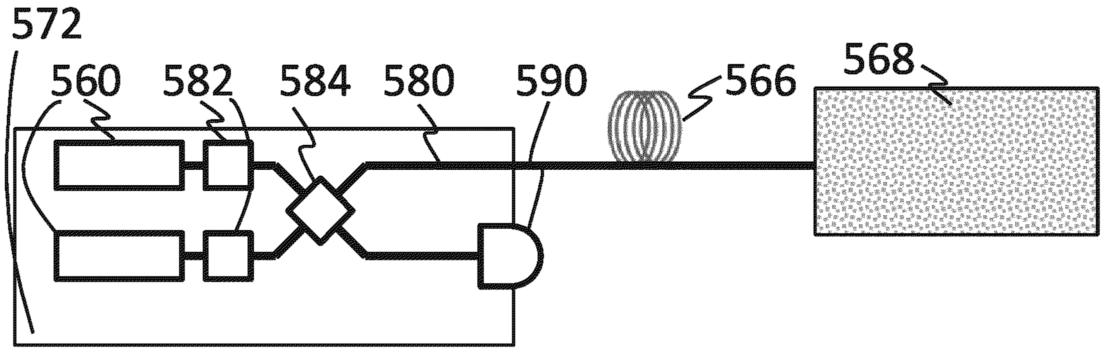
Figure 5C:
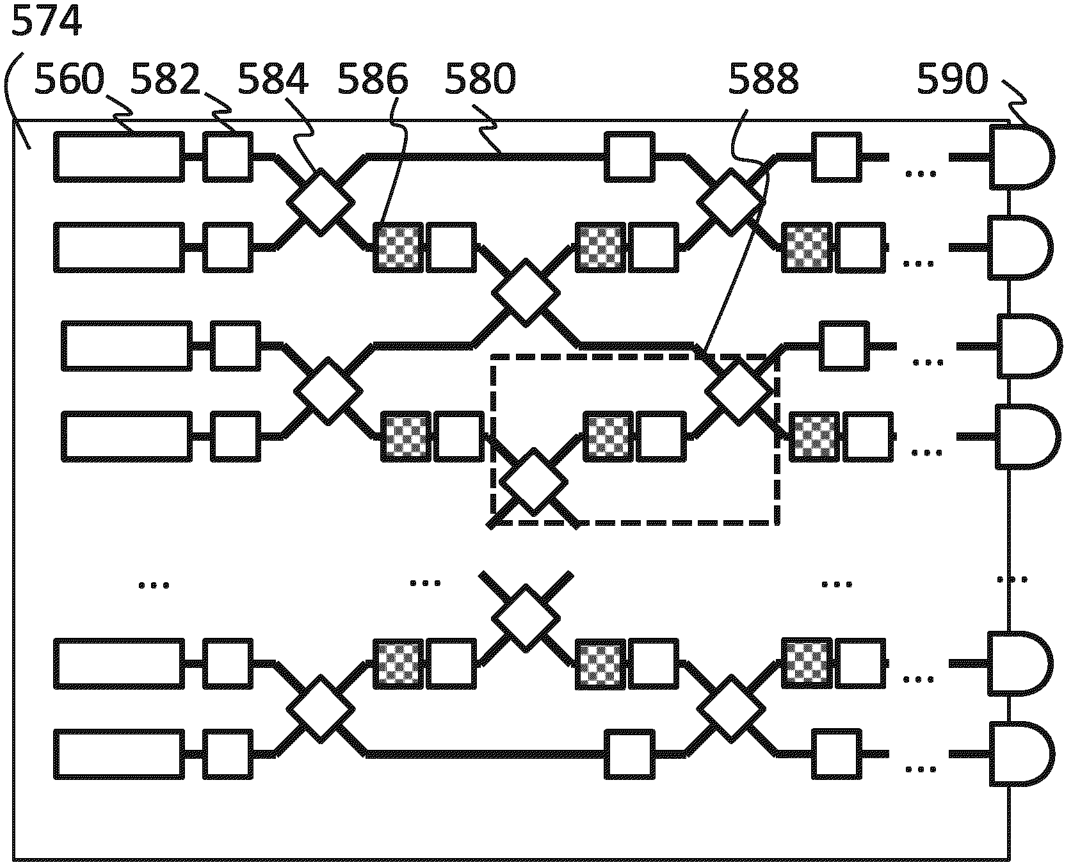

FIG. 5 illustrates optical devices in which the photonic integrated circuit 100, 200 acts as or is integrated in a squeezed-light source 560. For example, in a device for squeezed-light encoding 570, the generated electromagnetic wave passes through an adjustable phase shifter 582 and an optical I/Q modulator 598 before it is sent into a channel 566 for communication, where it is detected by a receiver 568 at another end of the channel. Waveguides 580 are used to guide the light on the chip. FIG. 5B illustrates an optical device for quantum key distribution, comprising two squeezed-light sources 560 on a single photonic chip 572, each squeezed-light source comprising or being a photonic integrated circuit 100, 200. A first electromagnetic wave generated in the first squeezed-light source passes a phase shifter 582 and a second electromagnetic wave generated in the second squeezed-light source passes another phase shifter 582 before they are combined at a beam splitter 584. An output beam of the beam splitter 584 is detected at a photodiode 590, whereas another output beam of the beam splitter 584 is coupled into a channel 566 for communication, where it is finally detected by a receiver 568 at another end of the channel. FIG. 5C illustrates an optical device for quantum computing with squeezed light 574. Similar to the device for quantum computing with photon pairs 476, the device 574 comprises several photonic integrated circuits 100, 200 serving as light sources, in this case as squeezed-light sources 560, and the generated electromagnetic waves are coupled into a network comprising phase shifters 582, beam splitters 584, and delay lines 586, basically acting as interferometers 588. An output state is probed at detectors 590.

The optical devices illustrated in FIG. 4 and FIG. 5 are only examples of optical devices that the photonic integrated circuit can be advantageously applied in, and the comprised components are only examples of components that can be combined on a photonic chip or in a photon integrated circuit together with the photonic integrated circuit according to Claim 1. For example, at least one of the following can be co-integrated: a sensor, a Peltier element, or a heat sink. Co-integration of any other optical, electrical, or micro-electro-mechanical system component is possible.

Figure 6:
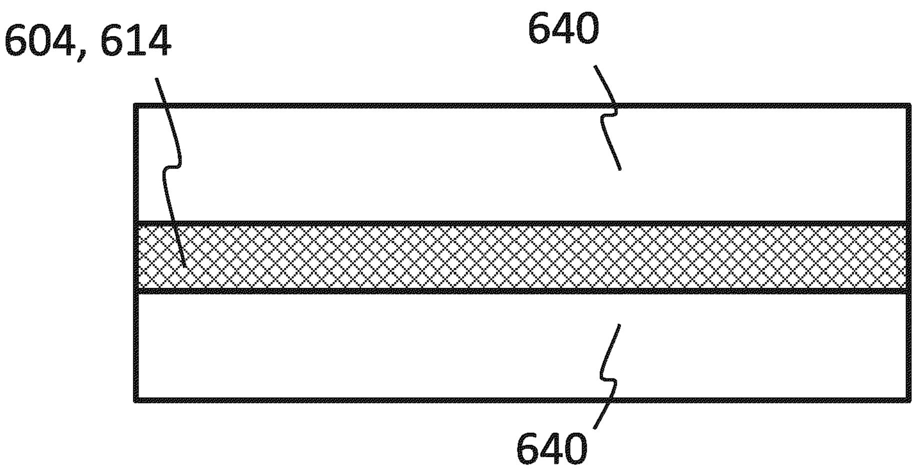
FIG. 6 is a schematic illustration of a cross sectional side view of the photonic integrated circuit, further comprising a heat sink according to an embodiment.

As illustrated for one embodiment in FIG. 6, the photonic integrated circuit may further comprise one or several heat sinks 640 in contact with the first waveguide substrate 604 or the second waveguide substrate 614. FIG. 6 shows a cross-sectional side view of an embodiment of the photonic integrated circuit with heat sinks 640 on both sides of a chip 604, 614 formed by the continuous first waveguide substrate 604 and second waveguide substrate 614. In some embodiments, the photonic integrated circuit can have only one heat sink 640 on one side of the chip 604, 614. In particular, the heat sink 640 may be at a bottom side of the chip, whereas the first waveguide 102, 202 and the second waveguide 112, 212 are on a top side of the chip. The design of the photonic integrated circuit with the first waveguide and second waveguide aligned allows for a large contact area between the heat sink 640 and the photonic integrated circuit 604, 614. This is an advantage in devices comprising the photonic integrated circuits, in particular in devices in which a stable temperature is critical. In particular, a strong requirement in terms of temperature stability of known sources of squeezed light, for example for squeezed state encoding 570, quantum key distribution 572, or quantum computing 574, are fulfilled by the photonic integrated circuit. In one embodiment, the thermal conductivity of the heat sink 640 exceeds 150 W/(m·K). In one embodiment, the heat sink 640 comprises diamond, or silicon carbide, or aluminum nitride, copper, silver or gold. In some embodiments, the heat sink 640 comprises diamond grown by chemical vapor deposition (CVD) or silicon carbide grown by CVD.

Figure 7:
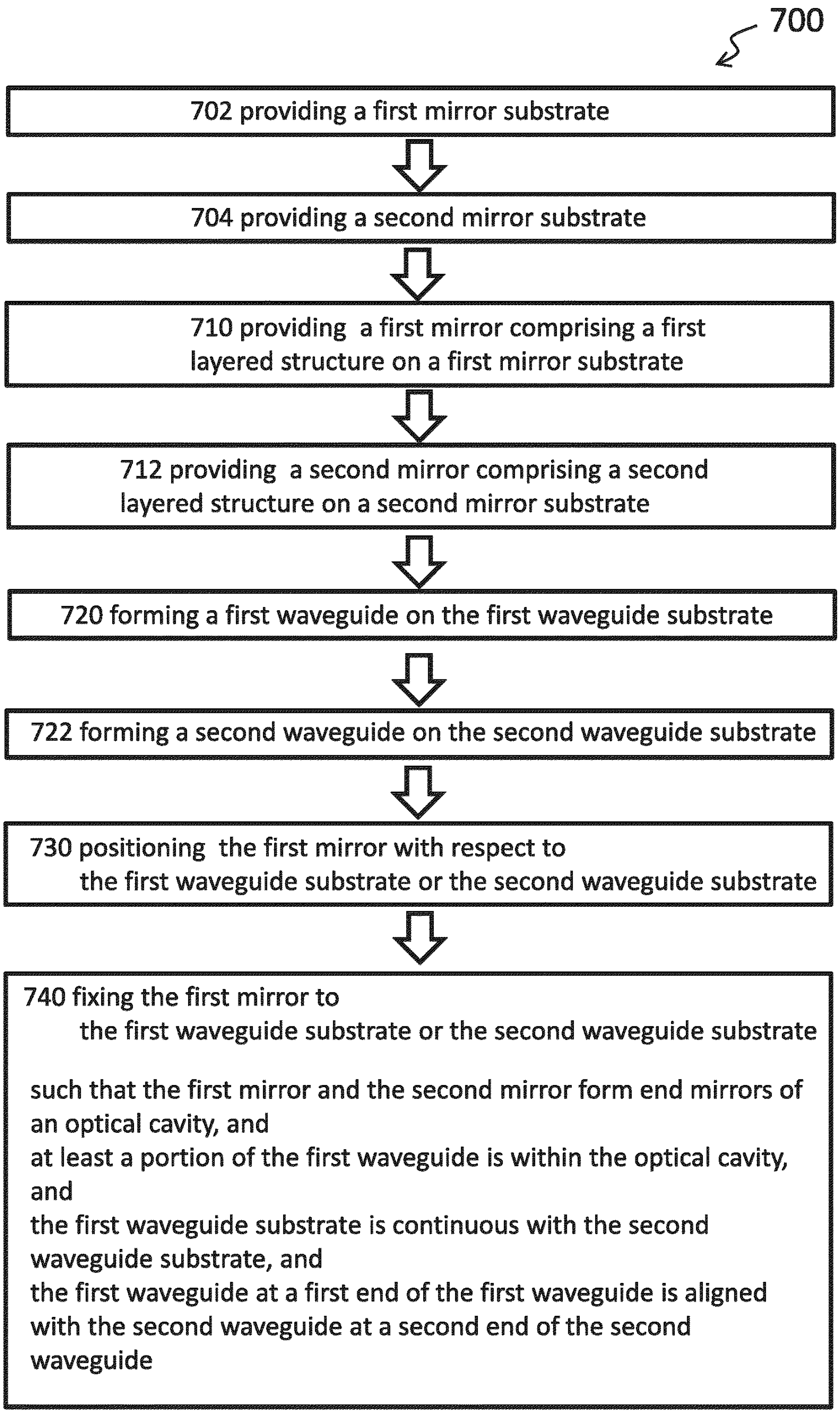
FIG. 7 gives a process flow illustrating a method for producing the photonic integrated circuit.

FIG. 7 illustrates a method 700 for producing a photonic integrated circuit. The method comprises providing 702 a first waveguide substrate 104, 204 and providing 704 a second waveguide substrate 114, 214. The method further comprises providing 710 a first mirror 120, 220 comprising a first layered structure 122, 222 on a first mirror substrate 124, 224, as well as providing 712 a second mirror 130, 230 comprising a second layered structure 132, 232 on a second mirror substrate 134, 234. The method further comprises forming 720 a first waveguide 102, 202 on the first waveguide substrate 104, 204, and forming 722 a second waveguide 112, 212 on the second waveguide substrate 114, 214. The method is characterized in that it comprises the following steps: positioning 730 the first mirror 120, 220 with respect to the first waveguide substrate 104, 204 or the second waveguide substrate 114, 214, and fixing 740 the first mirror 120, 220 to the first waveguide substrate 104, 204 or to the second waveguide substrate 114, 214. The positioning 730 and fixing 740 is done such that the first mirror 120, 220 and the second mirror 130, 230 form end mirrors of an optical resonator and that at least a portion 106, 206 of the first waveguide is within the optical resonator, and that the first waveguide substrate 104, 204 is continuous with the second waveguide substrate 114, 214, and that the first waveguide 102, 202 at a first end 108, 208 of the first waveguide is aligned with the second waveguide 112, 212 at a second end 118, 218 of the second waveguide.

The method may comprise all of these process steps, but not necessarily in the given order. The order of at least some of the process steps can be switched easily, without deviating from the disclosure.

Figure 8:
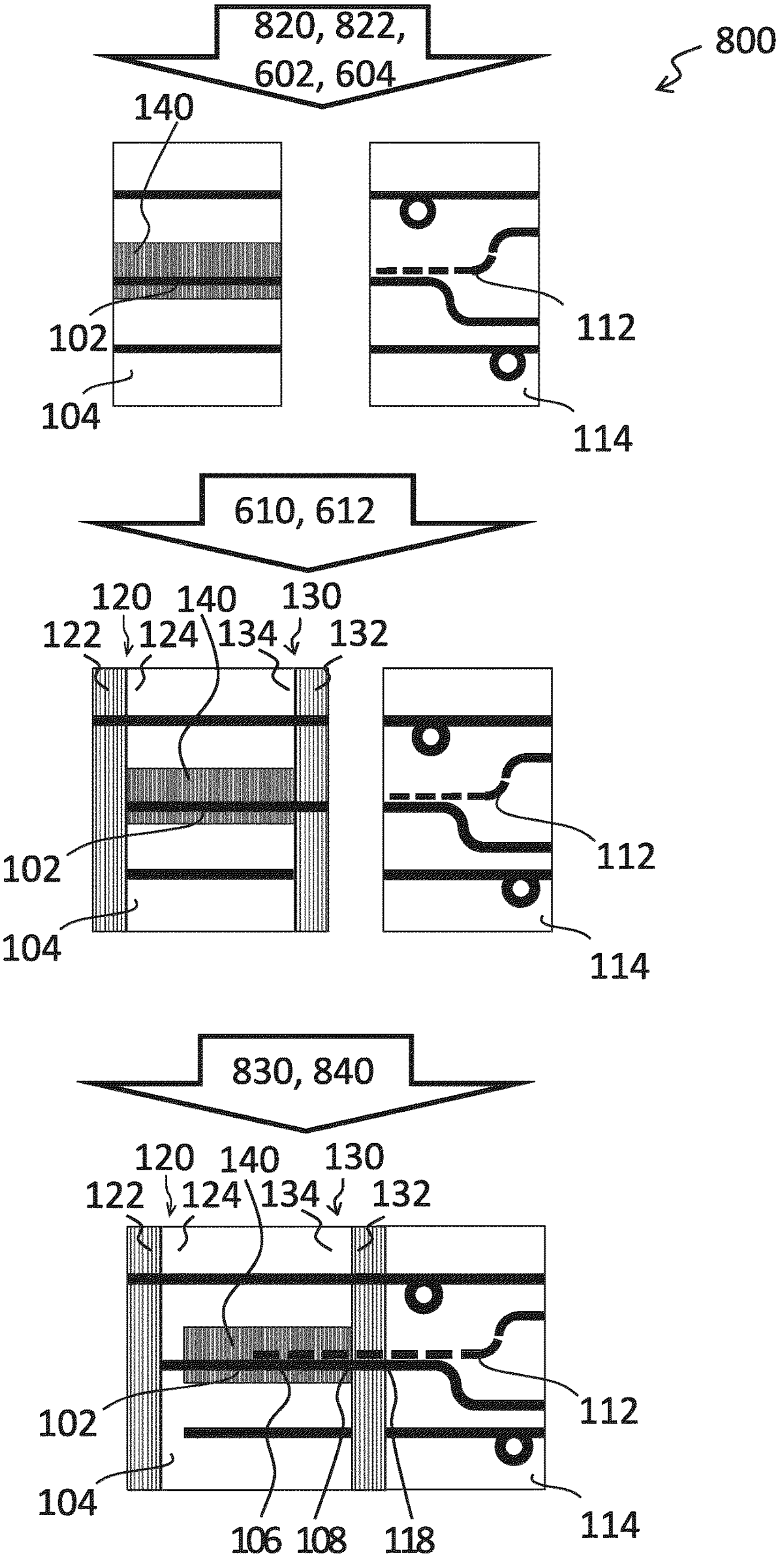
FIG. 8 illustrates a method for producing the photonic integrated circuit according to an embodiment.
Figure 9:
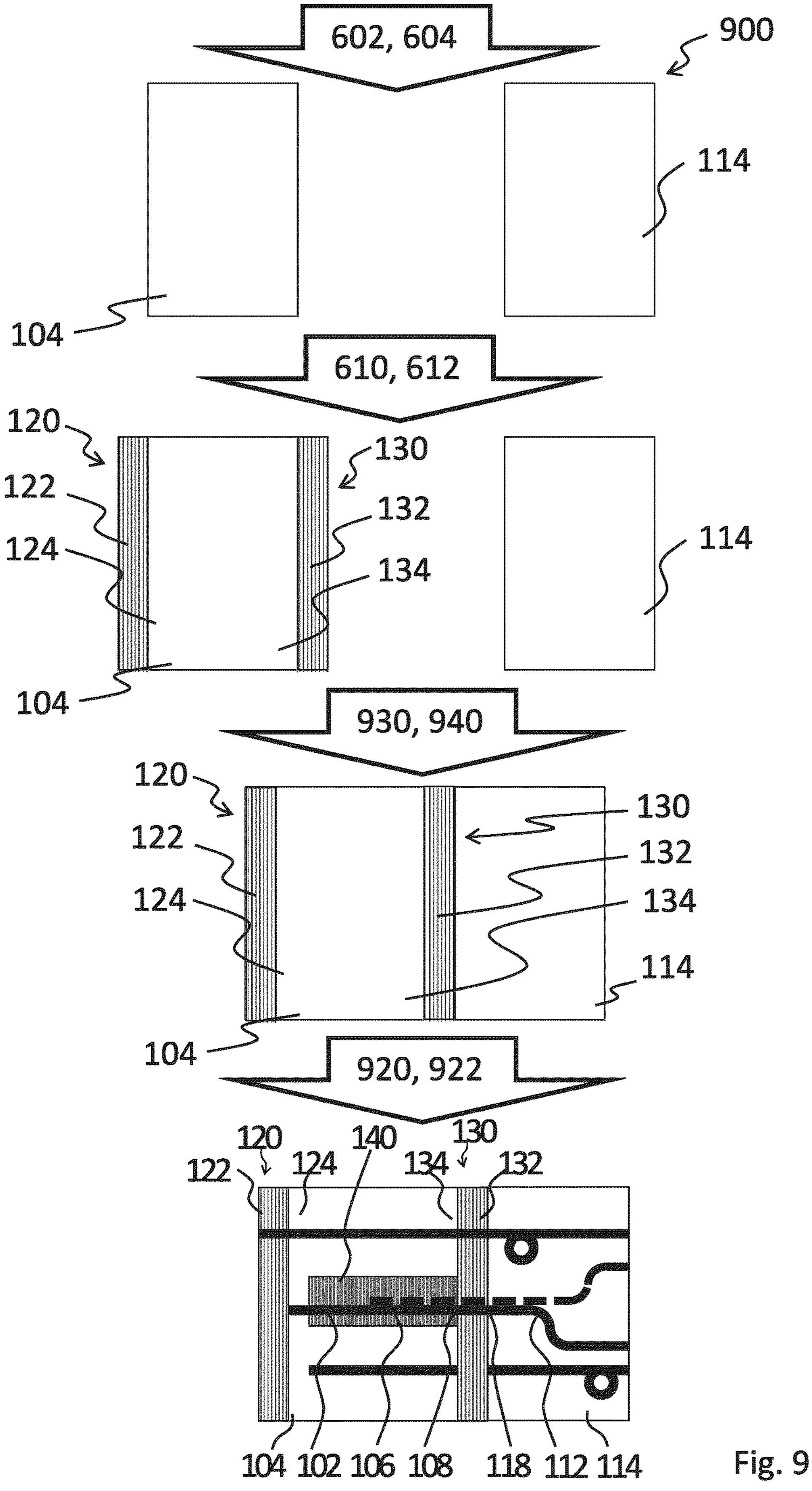
FIG. 9 illustrates a method for producing the photonic integrated circuit according to another embodiment

FIG. 8 and FIG. 9 illustrate embodiments of the method 700 in which the order of some of the process steps varies. In particular, forming 820, 822 the first waveguide 102, 202 or the second waveguide 112, 212 is performed prior to the positioning 830 and the fixing 840 according to one embodiment of the method 800 for producing the photonic integrated circuit illustrated in FIG. 8. In another embodiment of the method 900, FIG. 9, forming 920, 922 the first waveguide 102, 202 or the second waveguide 112, 212 happens after the positioning 930 and the fixing 940. In particular, forming 920, 922 the first waveguide 102, 202 or the second waveguide 112, 212 after the positioning 930 and the fixing 940 ensures the alignment of the first waveguide 102, 202 at the first end 108, 208 and the second waveguide 112, 212 at the second end 118, 218. This removes the risk of misalignment during the positioning step. This approach has the advantage of making the production more reliable. However, forming 920, 922 the first waveguide 102, 202 or the second waveguide 112, 212 after the positioning 930 and fixing 940 may involve processing routines, which can damage the first layered structure 122, 222 or the second layered structure 132, 232.

The method may comprise forming alignment structures on the first mirror substrate 124, 224 or the second mirror substrate 134, 234. These alignment structures may comprise alignment marks, which are configured to give an optical indication of the position of the first mirror substrate 124, 224 or the second mirror substrate 134, 234. The alignment structures may also comprise alignment slots 750 on or in the first mirror substrate 124, 224 or the second mirror substrate 134, 234. The positioning 730 can comprise optically aligning the mirror substrate with respect to the first waveguide substrate 104, 204 or the second waveguide substrate 114, 214 using the alignment structures. The positioning 730 can comprise moving the first mirror substrate 124, 224 with respect to the first waveguide substrate 104, 204 or the second waveguide substrate 114, 214, with the first mirror substrate 124, 224 in contact with the alignment slots 750. Alignment marks may be formed on the first waveguide substrate 104, 204 or the second waveguide substrate 114, 214 in addition to the alignment structures formed on the first mirror substrate 124, 224 or the second mirror substrate 134, 234. Positioning the first mirror with respect to the first waveguide substrate or the second waveguide substrate may comprise aligning the first mirror with respect to the first waveguide substrate or the second waveguide substrate according to at least one mechanical contact point provided by at least one alignment slot.

The method may further comprise polishing the first mirror substrate 124, 224 or the second mirror substrate 134, 234. In particular, the polishing step may comprise super polishing. The polishing step may involve polishing a section of the mirror substrates to a roughness of RMS<5 nm, in particular <1 nm. This may be useful for ultra-performance mirrors (reflectivity exceeding 99.99%), while for all other applications industrial grade polishing (>98%, >99.5%, or >99.9%) could be sufficient.

The method can further comprise depositing the first layered structure 122, 222 or the second layered structure 132, 232. The depositing may comprise evaporative deposition or sputter-deposition or ion-beam sputtering or magnetron sputtering. In one embodiment, at least one layer of the first layered structure 122, 222 or the second layered structure 132, 232 is produced using molecular beam deposition or molecular beam epitaxy (MBE). MBE results in the formation of at least one epitaxial layer, wherein the material forming the epitaxial layer can be the same or different from the material forming the substrate. If depositing the first layered structure 122, 222 or the second layered structure 132, 232 comprises molecular beam epitaxy, the layered structure is usually grown on a mirror substrate, which comprises crystalline material. In yet another embodiment, a layer of the layered structure of the mirror is deposited using atomic layer deposition. The production may further comprise removing at least a portion of the first mirror substrate 124, 224 or the second mirror substrate 134, 234 in a production step after fixing 740 the first mirror 120, 220 to the first waveguide substrate 104, 204 or the second waveguide substrate 114, 214. Depositing the first layered structure 122, 222 or depositing the second layered structure 132, 232 may comprise depositing a layer of the first layered structure 122, 222 or the second layered structure 132, 232 on the first waveguide 102, 202 or the second waveguide 112, 212.

Figure 10:
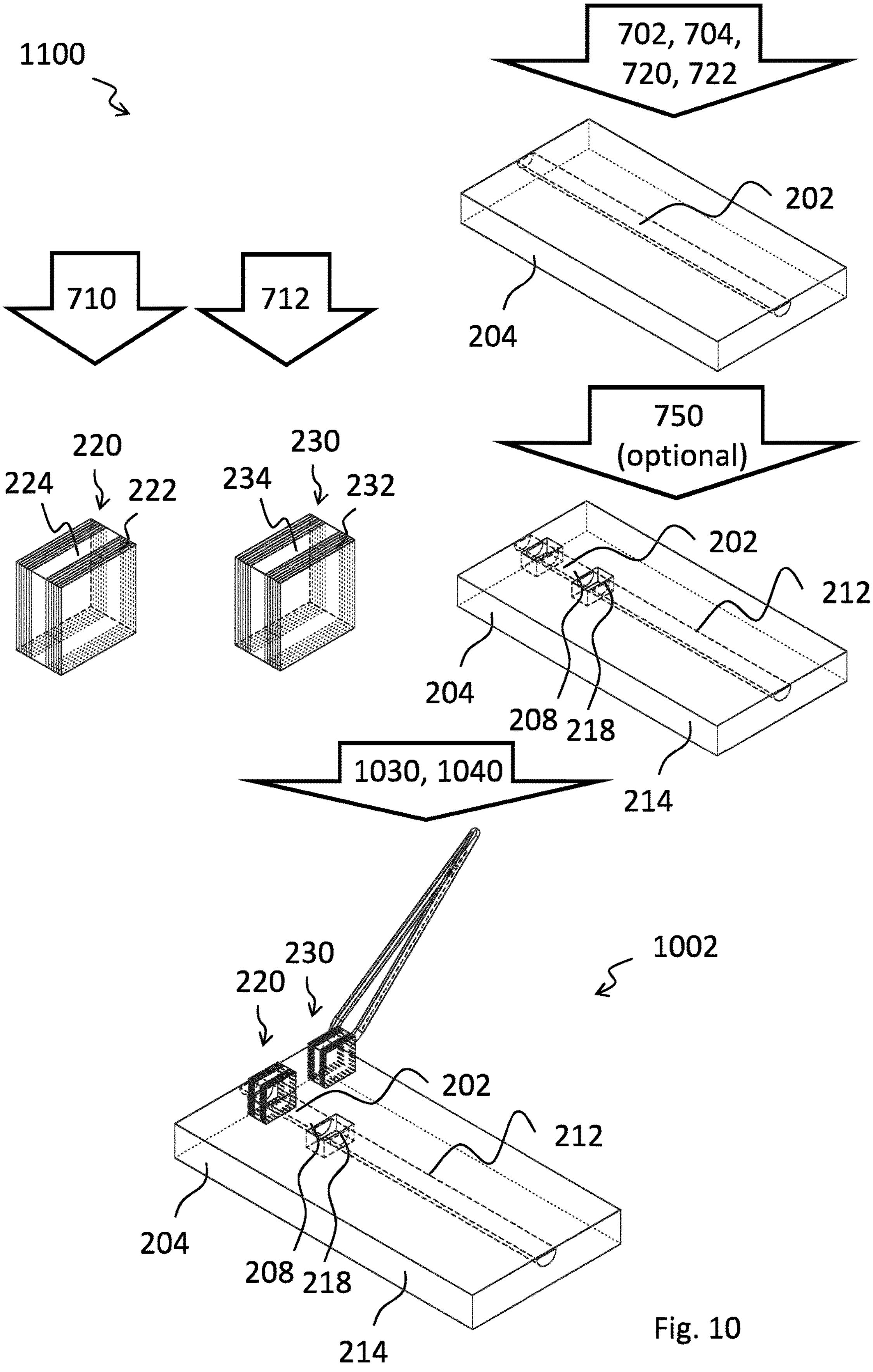
FIG. 10 illustrates a method for producing the photonic integrated circuit comprising a microassembly step or a robotic pick-and-place step.

FIG. 10 illustrates an embodiment of the method 1100, wherein the positioning 1030 and fixing 1040 of the first mirror 120, 220 comprises a microassembly step or a robotic pick-and-place step 1002. The microassembly step or robotic pick-and-place step 1002 comprises picking up the first mirror substrate 124, 224 by an automated device and placing it with a precision better than 10 μm, in particular better than 1 μm. Prior to the positioning 730, 1030 and fixing 740, 1040 a recess may be formed 750 in the first waveguide substrate 104, 204 or the second waveguide substrate 114, 214, such that at least a part of the first mirror 120, 220 is in the recess after the positioning 730 and fixing 740.

Figure 11A:
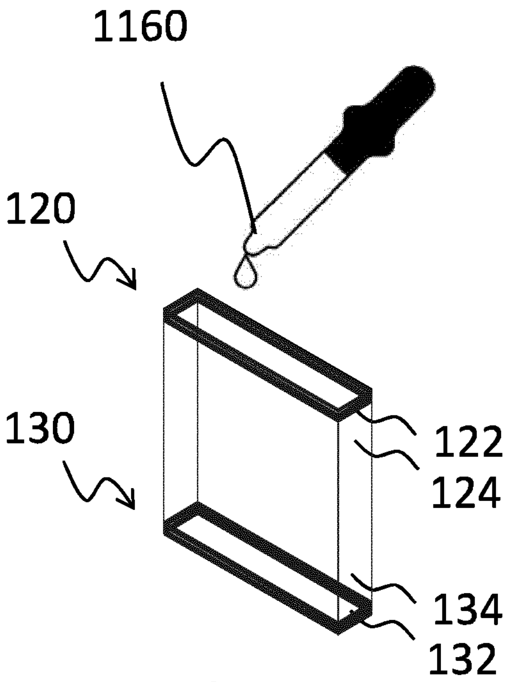
FIG. 11 illustrates a method for producing the photonic integrated circuit comprising a direct bonding step.
Figure 11B:
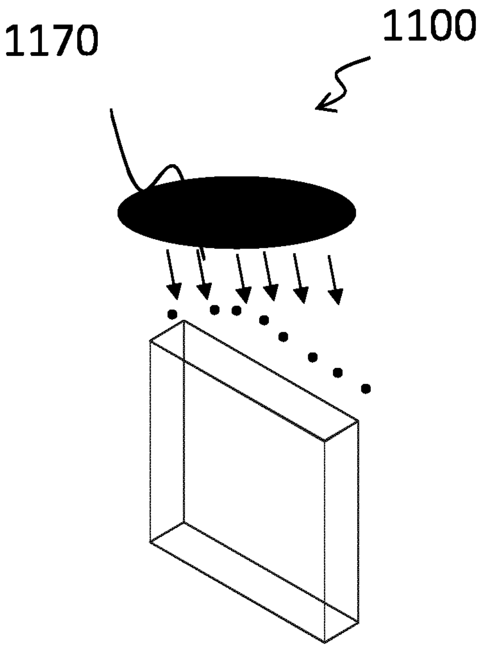
Figure 11C:
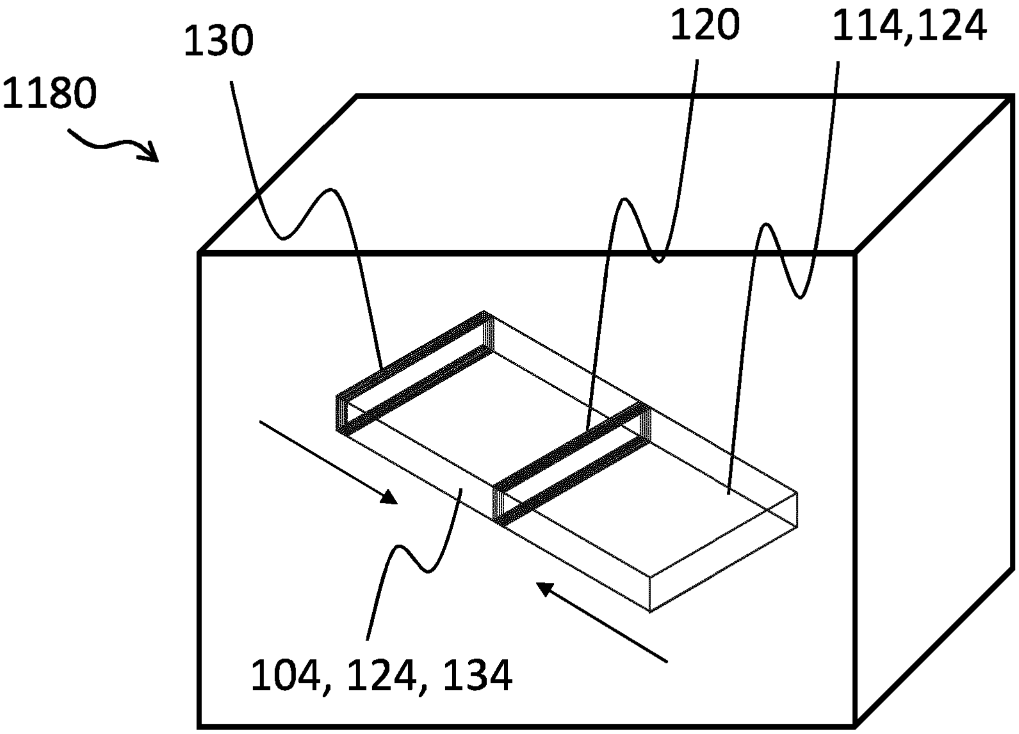

FIG. 11 illustrates an embodiment of the method 700, wherein the positioning 730 and fixing 740 comprise direct bonding 1100 the first waveguide substrate 104 and the second waveguide substrate 114 The direct bonding may for example comprise surface activated bonding, plasma activated bonding, adhesive bonding, anodic bonding, eutectic bonding, glass frit bonding, thermocompression bonding, or reactive bonding. The direct bonding can, for example, comprise a chemical cleaning step using a solvent 1160 as illustrated in FIG. 11A. The direct bonding can, for example, comprise a treatment with a plasma 1170 as illustrated in FIG. 11B. The direct bonding can, for example, comprise a direct bonding of the first mirror 120 and the first waveguide substrate 104 or the second waveguide substrate 114 in a vacuum apparatus 1180 as illustrated in FIG. 11C. An intermediate layer may be formed between the first mirror 120 and the first waveguide substrate 104 or the second waveguide substrate 114. The intermediate layer can comprise silicon or silicon oxide.

The first mirror substrate 124, 224 can have a thickness of at least 1 mm, in particular of at least 10 mm. The first waveguide substrate 104, 204 or the second waveguide substrate 114, 214 can have a thickness of at least 1 mm, in particular of at least 10 mm. Also, the first waveguide substrate 104, 204 or the second waveguide substrate 114, 214 can be attached to an auxiliary substrate with a thickness of at least 1 mm, in particular of at least 10 mm. A sufficient thickness of the first mirror substrate 124, 224 or the first waveguide substrate 104, 204 or the second waveguide substrate 114, 214 or the auxiliary substrate advantageously makes handling the substrate more reliable and avoids breaking a substrate during the positioning 730 and fixing 740. It also improves an adhesion between the first mirror 120, 220 and the first waveguide substrate 104, 204 or the second waveguide substrate 114, 214, making a joint more reliable, and reducing the danger that the joint breaks in the presence of movements and vibrations.

Producing the photonic integrated circuit can further comprise attaching a heat sink 640 as illustrated in FIG. 6 to the first waveguide substrate 104, 204, 604 or to the second waveguide substrate 114, 214, 614. The heat sink 640 allows for an efficient thermal management of the photonic integrated circuit. The heat sink 640 can comprise diamond, silicon carbide, aluminum nitride, copper, silver or gold. Forming the heat sink may comprise chemical vapor deposition of diamond or silicon carbide. The design of the photonic integrated circuit advantageously allows for at least two heat sinks 640 on different sides of the first waveguide substrate or the second waveguide substrate 604, 614 as illustrated in FIG. 6.

The description and the drawings are intended to illustrate the disclosure and the numerous advantages associated therewith, but should not be understood to imply any limitation. The scope of the disclosure is to be determined from the appended claims.

The invention claimed is:

1. A photonic integrated circuit, comprising:

a first waveguide on a first waveguide substrate, a second waveguide on a second waveguide substrate, a resonator device, comprising:

a first mirror, comprising a first layered structure on a first mirror substrate, wherein the first mirror substrate is provided by or fixed to the first waveguide substrate or the second waveguide substrate, a second mirror, comprising a second layered structure on a second mirror substrate, wherein the second mirror substrate is provided by or fixed to the first waveguide substrate or the second waveguide substrate, wherein the first mirror and the second mirror form end mirrors of an optical resonator, and wherein at least a portion of the first waveguide is within the optical resonator, wherein the first waveguide substrate is continuous with the second waveguide substrate, wherein a portion of the first layered structure or the second layered structure is embedded within a continuous body formed by the first waveguide substrate and the second waveguide substrate, and wherein a first end of the first waveguide is aligned with a second end of the second waveguide such that an extension of an axis of the first waveguide at the first end of the first waveguide coincides with an axis of the second waveguide at the second end of the second waveguide, thereby enabling light to couple directly along a straight line from the first waveguide to the second waveguide.

2. The photonic integrated circuit according to claim 1, wherein the first waveguide or the first waveguide substrate comprises a nonlinear optical medium.

3. The photonic integrated circuit according to claim 2, wherein the non-linear optical medium is adapted to convert an incoming electromagnetic wave with at least one incoming frequency to at least one generated electromagnetic wave with at least one generated frequency, wherein at least one generated frequency is different from at least one incoming frequency.

4. The photonic integrated circuit according to claim 3, wherein the generated electromagnetic wave comprises an electromagnetic wave in a squeezed state.

5. The photonic integrated circuit according to claim 1, wherein the first layered structure or the second layered structure comprises a layer of a material different from the first mirror substrate or the second mirror substrate.

6. The photonic integrated circuit according to claim 1, further comprising a second optical resonator and a third mirror with a third layered structure on a third mirror substrate, wherein:

the third mirror substrate is provided by or fixed to the first waveguide substrate or the second waveguide substrate, and wherein the third mirror forms an end mirror of the second optical resonator, the second optical resonator being different from or spatially separate from the optical resonator.

7. The photonic integrated circuit according to claim 1, further comprising at least one heat sink in physical contact with the first waveguide substrate or the second waveguide substrate.

8. The photonic integrated circuit according claim 1, wherein the first waveguide substrate and the second waveguide substrate form a continuous chip, wherein the resonator and an additional component are co-integrated on the continuous chip.

9. The photonic integrated circuit according to claim 1, wherein the first waveguide substrate or the second waveguide substrate comprises a nonlinear optical medium.

10. The photonic integrated circuit according to claim 1, further comprising a focusing or defocusing element, at least a portion of which is located between the first waveguide and the second waveguide.

11. A device, comprising:

a photonic integrated circuit, comprising:

a first waveguide on a first waveguide substrate, a second waveguide on a second waveguide substrate, a resonator device, comprising:

a first mirror, comprising a first layered structure on a first mirror substrate, wherein the first mirror substrate is provided by or fixed to the first waveguide substrate or the second waveguide substrate, a second mirror, comprising a second layered structure on a second mirror substrate, wherein the second mirror substrate is provided by or fixed to the first waveguide substrate or the second waveguide substrate, wherein the first mirror and the second mirror form end mirrors of an optical resonator, and wherein at least a portion of the first waveguide is within the optical resonator, wherein the first waveguide substrate is continuous with the second waveguide substrate, a portion of the first layered structure or the second layered structure is embedded within a continuous body formed by the first waveguide substrate and the second waveguide substrate, and a first end of the first waveguide is aligned with a second end of the second waveguide such that an extension of an axis of the first waveguide at the first end of the first waveguide coincides with an axis of the second waveguide at the second end of the second waveguide, thereby enabling light to couple directly along a straight line from the first waveguide to the second waveguide;

the device comprising an optical parametric oscillator, a cavity-enhanced photon-pair source, a second-harmonic generator, a difference-frequency generator, or a sum-frequency generator, or wherein the device is adapted for frequency-comb generation, frequency-comb spectroscopy, squeezed-light generation, squeezed-state encoding, quantum key distribution, quantum computing, generation of single frequency modes of ultra-narrow bandwidth, wavelength-division multiplexing, sensing, light ranging and detection (LIDAR), spectroscopy, or mid-infrared spectroscopy.

12. A method for producing a photonic integrated circuit, the method comprising:

providing a first waveguide substrate, providing a second waveguide substrate, providing a first mirror comprising a first layered structure on a first mirror substrate, providing a second mirror comprising a second layered structure on a second mirror substrate, forming a first waveguide on the first waveguide substrate, forming a second waveguide on the second waveguide substrate, positioning the first mirror with respect to the first waveguide substrate or the second waveguide substrate, and fixing the first mirror to the first waveguide substrate or the second waveguide substrate, wherein the first mirror and the second mirror form end mirrors of an optical resonator, at least a portion of the first waveguide is within the optical resonator, the first waveguide substrate is continuous with the second waveguide substrate, and a portion of the first layered structure or the second layered structure is embedded within a continuous body formed by the first waveguide substrate and the second waveguide substrate, and a first end of the first waveguide is aligned with a second end of the second waveguide such that an extension of an axis of the first waveguide at the first end of the first waveguide coincides with an axis of the second waveguide at the second end of the second waveguide, thereby enabling light to couple directly along a straight line from the first waveguide to the second waveguide.

13. The method according to claim 12, wherein the positioning the first mirror with respect to the first waveguide substrate or the second waveguide substrate and the fixing the first mirror to the first waveguide substrate comprise a microassembly step or a robotic pick-and-place step.

14. The method according to claim 12, wherein the fixing the first mirror to the first waveguide substrate comprises direct bonding of the first waveguide substrate and the second waveguide substrate.

15. The method according to claim 12, which further comprises attaching a heat sink to the first waveguide substrate or to the second waveguide substrate.

16. The device according to claim 11, wherein the first waveguide or the first waveguide substrate comprises a nonlinear optical medium.

17. The device according to claim 16, wherein the nonlinear optical medium is adapted to convert an incoming electromagnetic wave with at least one incoming frequency to at least one generated electromagnetic wave with at least one generated frequency, wherein at least one generated frequency is different from at least one incoming frequency.

18. The device according to claim 17, wherein the generated electromagnetic wave comprises an electromagnetic wave in a squeezed state.

19. The device according to claim 11, wherein the first layered structure or the second layered structure comprises a layer of a material different from the first mirror substrate or the second mirror substrate.

20. The device according to claim 11, further comprising a second optical resonator and a third mirror with a third layered structure on a third mirror substrate, wherein:

the third mirror substrate is provided by or fixed to the first waveguide substrate or the second waveguide substrate, and wherein the third mirror forms an end mirror of the second optical resonator, the second optical resonator being different from or spatially separate from the optical resonator.

* * * * *